US012079737B1

(12) United States Patent
Biswas

(10) Patent No.: US 12,079,737 B1
(45) Date of Patent: Sep. 3, 2024

(54) DATA-MINING AND AI WORKFLOW PLATFORM FOR STRUCTURED AND UNSTRUCTURED DATA

(71) Applicant: ThinkTrends, LLC, Herndon, VA (US)

(72) Inventor: Jyotiska Biswas, Herndon, VA (US)

(73) Assignee: THINKTRENDS, LLC, Herndon, VA (US)

( * ) Notice: Subject to any disclaimer, the term of this patent is extended or adjusted under 35 U.S.C. 154(b) by 902 days.

(21) Appl. No.: 17/036,753

(22) Filed: Sep. 29, 2020

(51) Int. Cl.
| G06N 5/04 | (2023.01) |
| G06F 16/22 | (2019.01) |
| G06F 16/23 | (2019.01) |
| G06F 16/26 | (2019.01) |
| G06F 16/28 | (2019.01) |
| G06N 20/00 | (2019.01) |

(52) U.S. Cl.
CPC ............. *G06N 5/04* (2013.01); *G06F 16/22* (2019.01); *G06F 16/2379* (2019.01); *G06F 16/26* (2019.01); *G06F 16/285* (2019.01); *G06N 20/00* (2019.01)

(58) Field of Classification Search
CPC .......... G06N 5/04; G06N 20/00; G06F 16/22; G06F 16/2379; G06F 16/285; G06F 16/26
See application file for complete search history.

(56) References Cited

U.S. PATENT DOCUMENTS

| 6,804,656 | B1 * | 10/2004 | Rosenfeld | .............. | G16H 20/40 |
| | | | | | 600/300 |
| 6,839,714 | B2 * | 1/2005 | Wheeler | .................. | G06F 16/25 |
| | | | | | 707/999.102 |
| 9,031,926 | B2 * | 5/2015 | Milward | ............... | G06F 40/284 |
| | | | | | 707/706 |
| 9,037,615 | B2 * | 5/2015 | Bornea | .................. | G06F 16/901 |
| | | | | | 707/803 |
| 9,208,217 | B2 * | 12/2015 | Milward | ............... | G06F 16/313 |
| 9,535,902 | B1 * | 1/2017 | Michalak | ............ | G06F 16/3331 |

(Continued)

FOREIGN PATENT DOCUMENTS

WO  WO-2023081921 A1 *  5/2023  ......... G06F 21/6254

OTHER PUBLICATIONS

Hashem, Elsevier, 2014, pp. 98-115.*
Liu, Elsevier, Jan. 2020, pp. 1-26.*

*Primary Examiner* — Michael I Ezewoko
(74) *Attorney, Agent, or Firm* — Raj S. Dave; Dave Law Group LLC

(57) ABSTRACT

A method of data mining and AI workflow platform for structured and unstructured data is described. The method comprises receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; labeling and annotating seamlessly the data available in the database; and building an artificial intelligence (AI) model based on at least one of the data available in the database, the input from the user, and the predefined rule.

13 Claims, 15 Drawing Sheets

(56) References Cited

U.S. PATENT DOCUMENTS

| | | | | |
|---|---|---|---|---|
| 10,235,633 B2* | 3/2019 | Tereshkov | | G06F 16/9024 |
| 10,614,196 B2* | 4/2020 | Maitra | | G16H 50/20 |
| 10,755,804 B2* | 8/2020 | Katwala | | G06F 40/169 |
| 10,878,010 B2* | 12/2020 | Labkoff | | G16H 10/60 |
| 10,957,433 B2* | 3/2021 | Lucas | | G16H 70/00 |
| 10,997,613 B2* | 5/2021 | Leung | | G06N 20/00 |
| 11,501,302 B2* | 11/2022 | Handelman | | G06F 40/30 |
| 11,599,666 B2* | 3/2023 | Nayak | | G06F 16/35 |
| 11,615,148 B2* | 3/2023 | Duishoev | | G06F 16/353 707/769 |
| 11,709,877 B2* | 7/2023 | Barkan | | G06F 40/284 707/711 |
| 2002/0173702 A1* | 11/2002 | Lebel | | A61M 5/14276 600/300 |
| 2004/0122790 A1* | 6/2004 | Walker | | G16H 50/70 |
| 2007/0005621 A1* | 1/2007 | Lesh | | G16H 10/60 |
| 2007/0174277 A1* | 7/2007 | Giang | | G06F 16/24556 |
| 2008/0162393 A1* | 7/2008 | Iliff | | G16H 10/60 706/46 |
| 2009/0210418 A1* | 8/2009 | Arasu | | G06F 16/258 |
| 2011/0106821 A1* | 5/2011 | Hassanzadeh | | G06F 40/30 707/794 |
| 2011/0288877 A1* | 11/2011 | Ofek | | G16H 50/20 707/661 |
| 2012/0110016 A1* | 5/2012 | Phillips | | G16Z 99/00 707/E17.014 |
| 2012/0265544 A1* | 10/2012 | Hwang | | G16H 40/20 705/1.1 |
| 2013/0006968 A1* | 1/2013 | Gusmini | | G06F 16/25 707/E17.014 |
| 2013/0096947 A1* | 4/2013 | Shah | | G16H 10/60 705/3 |
| 2013/0238623 A1* | 9/2013 | Wyllie | | G06F 16/285 707/737 |
| 2013/0246049 A1* | 9/2013 | Mirhaji | | G06F 40/253 704/9 |
| 2014/0122117 A1* | 5/2014 | Masarie, Jr. | | G16H 70/20 705/3 |
| 2014/0244625 A1* | 8/2014 | Seghezzi | | G16B 50/00 707/722 |
| 2014/0249761 A1* | 9/2014 | Carroll | | G16B 20/00 702/19 |
| 2014/0278461 A1* | 9/2014 | Artz | | G16H 20/10 705/2 |
| 2014/0280353 A1* | 9/2014 | Delaney | | G16H 10/60 707/794 |
| 2014/0330845 A1* | 11/2014 | Feldschuh | | G06F 16/215 707/749 |
| 2015/0006558 A1* | 1/2015 | Leighton | | G06F 16/93 707/756 |
| 2015/0106125 A1* | 4/2015 | Farooq | | G16H 40/20 705/3 |
| 2015/0178386 A1* | 6/2015 | Oberkampf | | G06F 16/367 707/749 |
| 2015/0213194 A1* | 7/2015 | Wolf | | G16H 10/60 705/3 |
| 2015/0331909 A1* | 11/2015 | Sundquist | | G06F 16/951 707/722 |
| 2016/0048655 A1* | 2/2016 | Maitra | | G16H 70/40 705/3 |
| 2017/0046425 A1* | 2/2017 | Tonkin | | G06F 16/3344 |
| 2017/0109502 A1* | 4/2017 | Labkoff | | G06F 16/3341 |
| 2017/0177597 A1* | 6/2017 | Asimenos | | G06F 16/188 |
| 2017/0237805 A1* | 8/2017 | Worley | | H04L 67/10 709/226 |
| 2018/0046764 A1* | 2/2018 | Katwala | | G16H 15/00 |
| 2018/0060523 A1* | 3/2018 | Farh | | G06F 16/248 |
| 2018/0121618 A1* | 5/2018 | Smith | | G16H 50/20 |
| 2018/0373844 A1* | 12/2018 | Ferrandez-Escamez | | G16H 50/20 |
| 2019/0057774 A1* | 2/2019 | Velez | | G16H 50/20 |
| 2019/0206524 A1* | 7/2019 | Baldwin | | G06F 40/169 |
| 2020/0176098 A1* | 6/2020 | Lucas | | G16H 10/60 |

\* cited by examiner

328

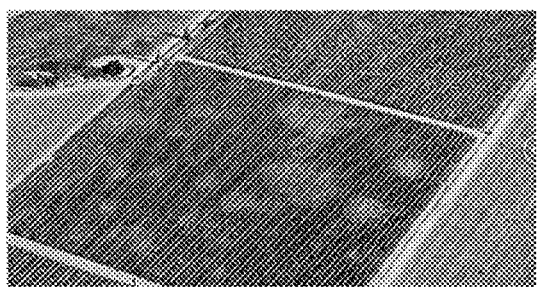
FIG. 3ua
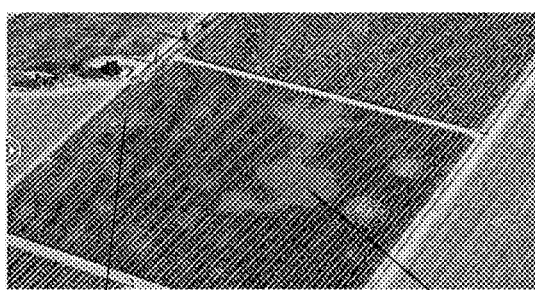
338   FIG. 3ub   340

DATA-MINING AND AI WORKFLOW PLATFORM FOR STRUCTURED AND UNSTRUCTURED DATA

FIELD OF THE INVENTION

The present disclosure relates broadly to Artificial Intelligence (AI) platform and more particularly to data mining, optimized Artificial Intelligence (AI) model building and Artificial Intelligence Lifecycle Management.

BACKGROUND

Data scientists spend 80% to 90% of their time on finding/preparing relevant datasets and data integration/cleaning. [Source: Michael Stonebraker. Ihab F. Ilyas: Data Integration: The Current Status and the Way Forward. IEEE Data Eng. Bull. 41(2) (2018)]. Furthermore, a high-level of specialized knowledge in a specific field in data science is needed (e.g. Computer Vision. Natural language Processing, time-series, and others) as a basic knowledge in computer science & machine learning will not be enough. Due to the fact that data exists in various formats across a broad array of storage domains for both unstructured and structured data, many software products along with data scientists and engineers are needed to build an intelligent system that can prepare the data, map the data points into correct input mappings for data analysis, and mappings for data labels and annotation. Hence, due to these challenges there is a vacuum of end-to-end tools that can appropriately handle the complexity of multiple data formats optimized for search, data visualizations, labeling/annotations, and machine learning.

"Conventional ML models, such as regression, decision trees, random forests, SVM, and Naïve Bayes models, are well understood, and often require elaborate feature engineering exercise to provision. In the last few years, there has been dramatic interest in "deep learning" (neural networks). The pioneering work came from Google, which successfully applied neural networks to find images of cats, and this technique has been successfully applied in a variety of other image understanding and text-oriented problems. In Tamr applications, there is little-to-no image and text data, rather, it is essentially all structured data such as found in relational DBMSs. As we discuss below, using deep learning in enterprise data integration applications remains challenged by the scarcity of training data, since most of these models require large quantities of labeled data to learn the classification task; and by the lack of reasonable explanations of the output decisions."; "Training Data: In general, generating training data in enterprise data integration tasks is a huge problem: consider three plausible terms; IBM-SA, IBM Inc and IBM. Intuitively, these might represent the Spanish subsidiary, the US subsidiary and the overall company. Deciding if these should be consolidated as duplicates or kept as separate meaningful related entities can be performed by a domain expert. Even then, the decision to consolidate or not could be determined by the question being asked. However, automatically "learning" these complex relationships among these entities, and the right merge/separate decision will probably require massive number of labeled data in a deep neural network model." [Source: Michael Stonebraker, Ihab F. Ilyas: Data Integration: The Current Status and the Way Forward. IEEE Data Eng. Bull. 41(2) (2018)].

"As the machine learning (ML) community continues to accumulate years of experience with live systems, a widespread and uncomfortable trend has emerged: developing and deploying ML systems is relatively fast and cheap, but maintaining them over time is difficult and expensive. This dichotomy can be understood through the lens of technical debt, a metaphor introduced by Ward Cunningham in 1992 to help reason about the long-term costs incurred by moving quickly in software engineering. As with fiscal debt, there are often sound strategic reasons to take on technical debt. Not all debt is bad, but all debt needs to be serviced. Technical debt may be paid down by refactoring code, improving unit tests, deleting dead code, reducing dependencies, tightening APIs, and improving documentation. The goal is not to add new functionality, but to enable future improvements, reduce errors, and improve maintainability. Deferring such payments results in compounding costs. Hidden debt is dangerous because it compounds silently." [Source: Hidden Technical Debt in Machine Learning Systems, D. Sculley, Gary Holt, Daniel Golovin, Eugene Davydov, Todd Phillips; Dietmar Ebner, Vinay Chaudhary, Michael Young, Jean-Francois Crespo. Dan Dennison].

"Traditional software engineering practice has shown that strong abstraction boundaries using encapsulation and modular design help create maintainable code in which it is easy to make isolated changes and improvements. Strict abstraction boundaries help express the invariants and logical consistency of the information inputs and outputs from a given component. Unfortunately, it is difficult to enforce strict abstraction boundaries for machine learning systems by prescribing specific intended behavior"; "[d]ependency debt is noted as a key contributor to code complexity and technical debt in classical software engineering settings. It is found that data dependencies in ML systems carry a similar capacity for building debt, but may be more difficult to detect. Code dependencies can be identified via static analysis by compilers and linkers. Without similar tooling for data dependencies, it can be inappropriately easy to build large data dependency chains that can be difficult to untangle." [Source: Hidden Technical Debt in Machine Learning Systems, D. Sculley, Gary Holt, Daniel Golovin, Eugene Davydov, Todd Phillips; Dietmar Ebner, Vinay Chaudhary, Michael Young, Jean-Francois Crespo, Dan Dennison].

In general. Enterprises such as federal agencies and commercial companies (large and medium alike) go through a tedious and expensive process through volume of manpower (e.g. large teams of engineers, data scientists) to implement data-driven Artificial Intelligence (AI) & Machine Learning (ML) systems. This is due to the fact that data exist in numerous formats both structured and unstructured (e.g. database files, compressed audio, video, 3D images) while machine learning algorithms vary broadly and require high-level of proficiency in data science and computer science. This leads to a permutation of challenges that tools currently do not address. Due to the lack of tools for end-to-end AI model development and deployment, scaling AI is HARD and costly. Further, In the real world, data is messy and tangled dependent. Hence raw data is seldom ready to be processed for machine learning.

Considering the knowledge of the persons skilled in the art, there is a long-felt need for unique an artificial intelligence platform and end-to-end tools that can appropriately handle the complexity of multiple data formats optimized for search, data visualizations, labeling/annotations, and machine learning, etc. by significantly reducing the time, manpower and skill needed to do these tasks.

SUMMARY

The present disclosure discloses one or more aspects of data-mining and AI workflow platform for structured and unstructured data.

In an aspect, a method is described. The method comprises receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; labeling and annotating seamlessly the data available in the database; and building an artificial intelligence (AI) model based on at least one of the data available in the database, the input from the user, and the predefined rule.

In an embodiment, the method comprises cataloging the data and recording a directory of information of at least meta data, data sets, files, and database information onto the database.

In another embodiment, the method comprises training the AI model based on at least one of the data available in the database, labels and annotations associated with the data, and the predefined rule.

In yet another embodiment, the method comprises re-training the AI model based on at least one of the data available in the database, the labels and the annotations associated with the data, and the predefined rule.

In yet another embodiment, the method comprises sharing the AI model as at least one of a web service, and an application to at least one client of the user by deploying the AI model.

In yet another embodiment, the method comprises customizing the AI model by at least one of (a) manipulating the data, (b) at least one of adding, modifying, removing at least one node of the AI model, and (c) training the AI model using the manipulated data.

In yet another embodiment, the method comprises integrating a first AI model and a second AI model by communicatively coupling the first AI model and the second AI model and establishing interconnections between the first AI model and the second AI model.

In yet another embodiment, the method comprises replicating a first AI model and building a second AI model by establishing at least one node and interconnection between the at least one node same as that of the first AI model, wherein the second AI model is the replication of the first AI model.

In yet another embodiment, the method comprises visualizing the data using a schema layer of a server.

In yet another embodiment, labeling and annotating seamlessly the data comprises at least one of: indicating data sets of the data with at least one of a word, a short phrase; and adding a remark to the data sets of the data.

In yet another embodiment, training the AI model is further performed based on identifying the at least one data format of the data in the database, determining a data pattern in the database, recognizing a location of the data in the database, and distinguishing between the data.

In yet another embodiment, the method further comprises providing a user interface to the user through a device associated with the user to interact with a server and build the AI model.

In yet another embodiment, building the AI model based on at least one of the data available in the database and the predefined rule comprises: preparing the data comprising the at least one data format that are intended for the AI model; selecting at least one node through a user interface provided to the user and establishing interconnections and communications between the at least one node; training the at least one node using the data; and deploying the AI model to process the data and provide an output to the user.

In yet another embodiment, the method further comprises enabling the user to interact with a server through a user interface, provided via a device associated with the user, and at least one of build, train, re-train, replicate, compare, and share the AI model.

In yet another embodiment, the method further comprises comparing a first AI model and a second AI model by determining a first configuration associated with the first AI model and determining a second configuration associated with the second AI model and comparing the first configuration and the second configuration.

In yet another embodiment, the method further comprises generating an output to the user based on the comparing of the first AI model and the second AI model.

In yet another embodiment, the AI model generates an output to the user based on at least one of the input provided by the user, the data, and the predefined rule.

In yet another embodiment, the AI model renders the output in the at least one data format to the user through a device associated with the user based on at least one of the input provided by the user, the data, and the predefined rule.

In yet another embodiment, the method further comprises building at least one data pipeline to a server through a user interface by selecting a plurality of data processing elements, arranging the plurality of data processing elements in at least one order, and establishing connection between the plurality of data processing elements.

In yet another embodiment, the method further comprises scaling the at least one data pipeline based on at least one of the data available in the database, data movement, data mining, data manipulation and data processing that are to be executed by the AI model.

In yet another embodiment, the AI model is implemented in at least one of a computer vision technology, a natural language processing (NLP) technology, a time series, a geo-spatial technology, a point cloud technology, the structured data, a speech recognition, and a speech synthesis technology.

In yet another embodiment, the predefined rule comprises a set of rules that are at least one of set by the user and associated with an organization of the user.

In yet another embodiment, the database comprises a structured database, a semi-structured database, and an unstructured database.

In yet another embodiment, receiving the data from the data source comprises: receiving the data from the data source in real-time.

In yet another embodiment, the method comprises scheduling automatically data extraction from a third-party database and uploading automatically the data to the database by establishing communication between the database and the third-party database.

In yet another embodiment, the method comprises monitoring the data in the database and providing an alert to the user, when the data comprises an anomaly.

In yet another embodiment, building the artificial intelligence (AI) model based on at least one of the data available in the database and the predefined rule: building the AI model on top of an existing AI model by analyzing the existing AI model and performing at least one of tuning the existing AI model and performing model optimization on the existing AI model.

In an aspect, a system is described. The system comprises a server comprising a memory, and a processor communicatively coupled to the memory, the processor configured to receive data from a data source, wherein the data comprises at least one data format of at least one of structured data, semi-structured data and unstructured data; index and analyze the received data; schedule and upload automatically the data to a database as per the indexing; visualize the data and determining at least the structured data, the semi-structured data, and the unstructured data from the data uploaded; cleanse and filter the data based on at least one of an input from a user, and a predefined rule; label and annotate seamlessly the data available in the database; and build an artificial intelligence (AI) model based on at least one of the data available in the database, the input from the user, and the predefined rule.

In another aspect, a non-transitory computer storage medium storing a sequence of instructions is described. The sequence of instructions which when executed by a processor, causes: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least the structured data, the semi-structured data, and the unstructured data from the data uploaded; cleansing and filtering the data based on at least one of an input from a user and a predefined rule; labeling and annotating seamlessly the data available in the database; and building an artificial intelligence (AI) model based on at least one of the data available in the database, the input from the user, and the predefined rule.

In another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; and visualizing the data and determining at least one of the structured data, the semi-structured data, and the unstructured data from the data uploaded.

In yet another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; and cleansing and filtering the data based on at least one of an input from a user, and a predefined rule.

In yet another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; and labeling and annotating seamlessly the data available in the database.

In yet another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; labeling and annotating seamlessly the data available in the database; and training an artificial intelligence (AI) model using at least one of the data available in the database, labels and annotations associated with the data, and the predefined rule at a first instant.

In yet another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; labeling and annotating seamlessly the data available in the database; training an artificial intelligence (AI) model using at least one of the data available in the database, labels and annotations associated with the data, and the predefined rule at a first instant; and re-training the AI model using at least one of the data available in the database, the labels and the annotations associated with the data, and the predefined rule at a second instant.

In yet another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; labeling and annotating seamlessly the data available in the database; building a first artificial intelligence (AI) and a second AI model based on at least one of the data available in the database, the input from the user, and the predefined rule; and integrating the first AI model and the second AI model by communicatively coupling the first AI model and the second AI model and establishing interconnections between the first AI model and the second AI model.

In yet another aspect, a method is described. The method comprises: receiving data from a data source, wherein the data comprises at least one data format of at least one of structured data, semi-structured data and unstructured data; indexing and analyzing the received data; scheduling and uploading automatically the data to a database as per the indexing; visualizing the data and determining at least one of the structured data, the semi-structured data, and the unstructured data from the data uploaded; cleansing and filtering the data based on at least one of an input from a user, and a predefined rule; labeling and annotating seamlessly the data available in the database; building a first artificial intelligence (AI) and a second AI model based on at least one of the data available in the database, the input from the user, and the predefined rule; and comparing the first AI model and the second AI model by determining a first configuration associated with the first AI model and determining a second configuration associated with the second AI model and comparing the first configuration and the second configuration.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein. The embodiments are illustrated by way of example and not limitation in the figures of the accompanying drawings, in which like references indicate similar elements and in which:

FIG. 3ua and FIG. 3ub illustrate an AI model trained and applied on a computer vison and object detection to detect at least drought areas and diseased crops in an image of agricultural field, according to one or more embodiments.

Figure 1A:
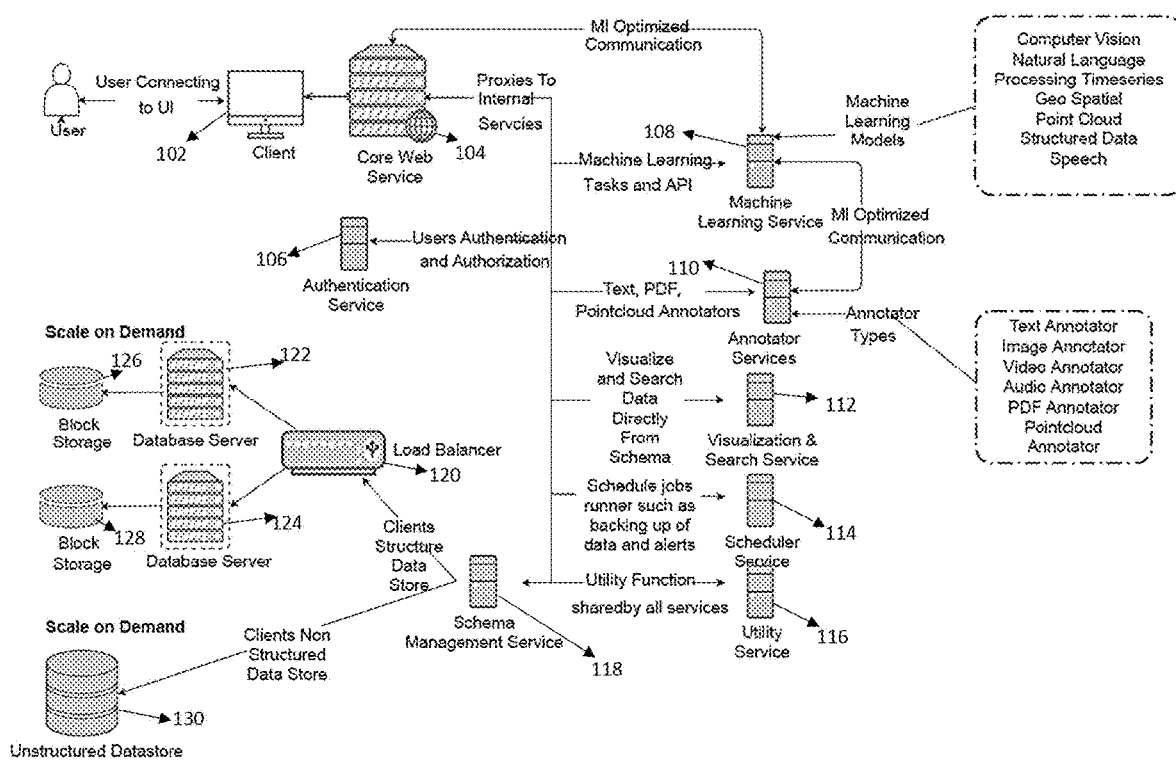
FIG. 1a illustrates an architecture diagram of a system, according to one or more embodiments.

Other features of the present embodiments will be apparent from the accompanying drawings and from the detailed description that follows.

DETAILED DESCRIPTION

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

The articles "a" and "an" are used herein refers to one or to more than one (i.e., to at least one) of the grammatical object of the article. By way of example, "an element" means one element or more than one element.

No element, act, or instruction used herein should be construed as critical or essential unless explicitly described as such. Also, as used herein, the articles "a" and "an" are intended to include items, and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

In this disclosure. "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should also be afforded to "consisting essentially of" language as well as "consisting of" language as if stated explicitly and vice versa.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Reference throughout this specification to "an example", "an instance", "for example" means that a particular feature, structure, or characteristic described in connection with the example is included in at least one embodiment. Thus, appearances of the phrases "in an example" in various places throughout this specification are not necessarily all referring to the same embodiment.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products. i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a PLC (Programmable Logic Controller), an FPGA (field programmable gate array), an ASIC (application specific integrated circuit), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Embodiments of the present disclosure may comprise or utilize a special purpose or general-purpose computer including computer hardware. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure can comprise at least two distinctly different kinds of computer-readable media: physical computer-readable storage media and transmission computer-readable media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described. Rather, the described features and acts are disclosed as example forms of implementing the claims.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network, such as a 5G network, or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject is not necessarily limited to the described features or acts described above. Rather, the described features and acts are disclosed as example forms of implementing subject matter.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Even though particular combinations of features are disclosed in the specification, these combinations are not intended to limit the disclosure of possible implementations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

An initial overview of technology embodiments is provided below and specific technology embodiments are then described in further detail. This initial summary is intended to aid readers in understanding the technology more quickly but is not intended to identify key or essential technological features, nor is it intended to limit the scope of the claimed subject matter.

The embodiments herein and the various features and advantageous details thereof are explained more fully with reference to the non-limiting embodiments that are illustrated in the accompanying drawings and detailed in the following description.

In order to fully understand the scope of the invention, the following terms used herein are hereby defined.

The term "comprising", which is synonymous with "including", "containing", or "characterized by" here is defined as being inclusive or open-ended, and does not exclude additional, unrecited elements or method steps, unless the context clearly requires otherwise.

As used herein. "Structured data" is comprised of clearly defined data types whose pattern makes them easily searchable. Structured data is data that adheres to a pre-defined data model and is therefore straightforward to analyze. Structured data conforms to a tabular format with relationship between the different rows and columns. Common examples of structured data are Excel files or SQL databases.

As used herein, "Unstructured data" (or unstructured information) is information that either does not have a pre-defined data model or is not organized in a pre-defined manner. Examples of "unstructured data" comprises, health records, audio, video, analog data, images, files, books, journals, documents, meta data, geo-spatial data, and unstructured text such as the body of an e mail message, Web page, or word-processor document, etc.

As used herein, "data pipelines" refers to a set of data processing elements to move and/or consolidate data between one system to another system. The data pipeline may also refer to a series of steps and/or actions that are intended for data movement and/or data modification. Data pipelines enable the flow of data from an application to a data warehouse, from a data lake to an analytics database, or into a payment processing system, for example.

As used herein, "Application Programming Interface (API)" refers to a computing interface which defines interactions between multiple software intermediaries. API defines the kinds of calls or requests that can be made, how to make them, the data formats that should be used, the conventions to follow, etc.

As used herein "Business Intelligence" comprises strategies, methodologies and technologies used for data analysis and business information. BI technologies provide historical, current, and predictive views of business operations. Common functions of business intelligence technologies comprise reporting, online analytical processing, analytics, data mining, process mining, complex event processing, business performance management, benchmarking, text mining, predictive analytics, and prescriptive analytics.

As used herein "data mining" refers to a process used to extract usable data from a larger set of any raw data. Data mining further refers to a process of discovering patterns in large data sets.

As used herein, "Machine learning" is an application of artificial intelligence (AI) that provides systems the ability to automatically learn and improve from experience without being explicitly programmed.

As used herein, "label" refers to describe someone or something in a word (e.g. name) or short phrase (e.g. short description). Label is like a slip affixed to someone or something for identification or description.

As used herein, "annotate" is adding notes to someone or something to giving explanation or comment.

As used herein, "AI models/ML models" refer to a building-block of abstracted intelligence that can be used to that predict, recognize, forecast, and generate patterns from data that exist in the form of executable binaries. "AI model/ML Model" are also models that are built, and trained using data and expert's inputs to make decision as equal to an expert's decision in that particular field.

As used herein, "neural network" refers to a computational learning system that uses a network of functions to understand and translate a data input of one form into a desired output, usually in another form. Neural networks recognize underlying relationships in a set of data.

As used herein, "user" is a person who is using the application and/or system. The term "user" as used herein refers to one or more persons using the application and/or the system.

As used herein, "Computer vision" refers to interpreting and understanding a visual world.

As used herein, "Natural Language Processing" refers to understanding and interpreting a human language.

As used herein, "Time series" refers to forecasting future values from numeric metrics (e.g., stock prices, econometrics, active users, wind speeds, etc.).

As used herein, "device" refers to an electronic element that cannot be divided without destroying its stated function.

As used herein, "real time" refers to an actual time during which an event, a process and/or an action occurs.

As used herein, "data pattern" defines the way in which the data collected (semi-structured data) can be structured, indexed, and made available for searching.

As used herein, "Point cloud" refers to information that enables to detect objects in three-dimensional (3D) space.

As used herein, "UI" refers to a user interface of the application/system.

In an embodiment, the system provides a one-stop-shop data mining platform that provides high-quality AI model artificial intelligence (AI) model building and artificial lifecycle (AI) management—all with zero lines of code (i.e. with minimal/zero knowledge of computer programming).

In another embodiment, the system provides a complete, end-to-end analytics and Artificial Intelligence tools for the user. The user may comprise a techie and/or an analyst in an organization.

In yet another embodiment, the system is configured to data cataloging.

In yet another embodiment, the system is configured to provide elegant visualizations and dashboards.

In yet another embodiment, the system is configured to annotate and label to the data in an optimized way.

In yet another embodiment, the system is configured to model lifecycle management.

In yet another embodiment, the system enables robotic process automation.

In yet another embodiment, the artificial intelligence model is deployed as a physical server in premises (e.g. residential, commercial, etc.) and/or organization of the user.

In yet another embodiment, the artificial intelligence model is deployed in cloud (e.g. AWS, GCP, AZURE®, etc.).

In yet another embodiment, the artificial intelligence model is deployed both physically (e.g. the physical server) and in the cloud.

The system provides services such as data searching, data cataloging, elegant visualizations and dashboards, data annotations and data labelling, artificial intelligence (AI) model management, robotic process automation, etc.

The system enables to build, train and customize artificial intelligence models suitable to the user's requirement.

With the advent of deep neural networks, commonly referred to as "deep learning", and the continued advancements in neural network algorithms and machine learning models have evolved in computation complexities and data preparation with real-world challenges such as data dependencies, missing/incorrect data, hidden feedback loops, entanglement and other technical debt. Therefore, the system aims to automate, understand the processing and prepares the data, fine-tune (e.g. hyperparameter tuning) AI and potential AI bias without any programming skills, regardless of whether it supervised or unsupervised machine learning techniques on the structured, the semi-structured, and/or the unstructured data.

In yet another embodiment, the lifecycle of AI model is managed using a lifecycle AI management tool. Once the AI model is built, the AI model is stored/recorded by the system. In an embodiment, the same AI model can be recorded at a first instant and a second instant (like creating a checkpoint where to can restore the AI model to a preferred checkpoint). The system enables the user to check efficiency/functionality of the AI model the first instant and the second instant and further enables the user to go back to an existing state i.e. changing the efficiency/functionality/configuration of the AI model from the second instant to the first instant. The lifecycle AI management tool is configured to modify, replicate, customize, train, re-train, share, serve and integrate the AI model. The lifecycle AI management tool allows the user to completely manage the lifecycle of the AI model and minimizes lot of time in constructing, training, replicating, re-training the AI model, etc.

In yet another embodiment, once the AI model is built, the user interfaces that allow the user to explore certain quality metrics of the AI model and compare the metric values against the other models that have been created. The performance of training & evaluation datasets used to create the model and other post-processing and interpretation of the output data of the model are shown and displayed to the user in coherent structure. The system enables the user to create the AI models (demanding zero programming from end user). Once the AI models are built. The AI model executes in at least 3 fundamental ways/methods to predict, forecast, detect, or generate the results from data: 1) Interactive Predictions, 2) Batched Predictions done internally from the application and 3) Predictions done through webservice accessible externally, etc. The AI model functions like a trial and an error.

1) Interactive Predictions: The system (e.g. the platform) allows the user to run interactive, on-the-fly predictions on the AI model that have been created. In essence, this allows the user to interactively run any data point existing inside the schema against a viable model (i.e. the data in the schema is a valid input to the selected model) and compute the predictions and provide the output (i.e. results) to the user. The system displays the results through a combination of in-memory and temporary storage. The system allows the user to submit the results as an accepted prediction, which would update the schema (i.e. a feedback loop that updates the schema) that contains the data point along with the results and some model configuration mapping data.

2) Batched Predictions done internally from the application: The platform allows the user to run large amount of the data points in the schema against the selected model. Once the user has some level of confidence on the performance of the AI model, or merely wants to experiment prediction trials for many data points, the user can query the schema to select the data points in specific way from the index and run the targeted data points against the model (which can be automated through the scheduling service/tool.

The system displays the results through a combination of in-memory and temporary storage techniques. The system allows the user to submit the results as the accepted prediction, which would update the schema (i.e. a feedback loop that updates the schema) that contains the data point along with the results and some model configuration mapping data. Batched predictions can be automated through the scheduler service for data up-stream ingestion or on a timely basis to the schema.

3) Predictions done through webservice accessible externally: In the event that the user wants to access the prediction or inference capability of the AI model outside the user interface in a programmatic way, the platform allows the user to access to the AI model through secure internet protocol technologies (e.g. SFTP, HTTP, RPC). Further the AI model lifecycle management tool allows the user to control/throttle and access for the custom AI models created when accessed through an external internet protocol.

In yet another embodiment, the system provides an AI model hub. The AI model hub is provided to a user via a user interface. The AI model hub is like a playground to the user (e.g. techies, analysts, etc.) to create, build, replicate, compare, share and serve (e.g. deploy) the AI models with a click of an input device (e.g. mouse, keyboard, etc.) associated with the user.

In yet another embodiment, the AI model hub empowers the user to teach, train and automate the artificial intelligence models simply and shifting away from relying on large data science and engineering teams.

In yet another embodiment, the AI model hub provides tools such as a) Model Explorer, b) Model Builder, c) Labeling Platform, etc. to the user. The Model explorer tool allows the user to explore and interact with the artificial intelligence model created to perform/execute the desired function. The Model explorer tool allows the user to conduct what-if scenarios and run inferences using the AI models and/or publish the AI models as a web service. The Model Builder tool comprises functionalities of seamless datascience workflows linked with robust data visualization. The Model Builder tool enables the user to build, re-train and/or clone the AI models. The Model Builder tool further enables to deploy the AI models to production and run batched predictions from highly visual interfaces. The labeling platform provides labelling and annotation to the data such as the structed data and the unstructured data. The labeling platform provides labelling and annotation to the highly complex data formats such as Images. Videos. 3D files, audio/speech, natural text, and of course the structured data.

In yet another embodiment, the system uses the State-of-the-art AI model to teach/train the AI model to really visualize the data and process (i.e. react) accordingly.

The system is configured to create the AI model in the following areas of AI and data science such as at least 1) Computer vision for Images, Videos, 2) Natural Language Processing & Understanding for free text, 3) Timeseries for sequential timestamped data. 4) Geo Spatial forecasting for aggregated geo-spatial data, 5) Point Cloud Detection that create AI models from 3D point cloud data, 6) Regression and Classification for Structured Data or sequential structured data, and 7) AI that can process and create audio and sound.

The AI model lifecycle management tool allows management of the entire data science lifecycle running on a compute infrastructure where virtual or physical servers or server clusters are hosted. The AI model lifecycle management tool allow the AI model to be trained in batches and predicted in parallel through the scheduling service/tool that optimally makes best use of the resources in a cluster based on business priorities. The platform reduces a need of time and effort and a need to be configured and programmed.

The AI model lifecycle management tool/service monitor and control various aspects of the AI model such as model creation, replication, re-training, user permissions/access and other modifications in meaningful ways to be effectively leveraged to either predict or detect certain factors from the data to manage and scale the AI model. If the data is real-time or changing periodically, it's far more important machine learning models stay up to date with changing data. The system also provides a simple way for this to be automated and scheduled to have the data up to date.

The User Interface (UI) assists the users to control the data preparation, data analysis, data annotation, and model training and these tools greatly reduces the effort needed to create intelligent systems. The UI allows the user to visualize the model as it learns, allowing the user to verify and benchmark the model against the other AI similar models. Due to the fact that training custom neural networks from scratch is a highly tedious process and require thousands of examples to be readily available. The system also provides "transfer learning" that allow previous AI neural network models trained using the system to be used as a "starting point" for the other models (this process is known as Transfer Learning in Machine learning), i.e. The system enables the user to build the other AI model from an existing point (e.g. the starting point) instead of building from scrap.

In yet another embodiment, the AI model hub further provides tools such as a computer vision tool, an object detection tool, an image semantic segmentation tool, a reverse image search tool, an image captioning tool, an image/Video Precognition tool, an image classification tool, a character recognition tool, etc. The computer vision tool is adapted to interpret and understand a visual world. In an embodiment, state-of-the-art AI models are created from digital images and videos using the model builder tool. The State-of-the-art AI models created are used by the system to teach/train the AI model to really see and process (i.e. react) accordingly. For an instance, the computer vision tool enables to interact with the data (e.g. image, video, text, etc.) analyzed and react according to the interaction. The object detection tool provides a computer vision and image processing technology. The object detection tool upon clicking/activated by the user detects instances of certain objects (such as humans, buildings, cars, etc.) in the data such as images, videos, etc. For an instance, the object detection tool finds applications in well researched domains such as pedestrian detection, face detection, pothole detection on roads while driving, etc. The object detection tool also finds applications in areas of computer vision including image retrieval and video surveillance.

The image semantic segmentation tool is configured to partition the data (e.g. the digital image) into multiple segments such as a set of pixels, a set of super-pixels, a set of voxels, etc. The image semantic segmentation tool is more powerful and precise. The image semantic segmentation tool is configured to detect the objects from the images as it finds accurate boundaries and edges of the objects. In an embodiment, the image semantic segmentation tool is configured to assign a label to every pixel in the image such that the pixels within the same label share certain characteristics. The reverse image search tool allows the user to select any image using a robust image analysis tools and perform reverse image search to find similar images. In an embodiment, the reverse image search tool finds the similar images based on at least one of design, color, font and visual indicator present in the image.

The image captioning tool is configured to assign a description or a set of keywords to the digital image. The image captioning tool is used in image retrieval to organize and locate images of interest from the database. The images of interest refer to the images that are looks similar and/or having characteristics. The Image/Video Precognition tool analyses the data (such as images and/or videos) and provides information of what happens next from the video or the series of images. In an embodiment, the Image/Video Precognition tool generates short videos or "frames of images" that forecast into the future to show what happens next. In another embodiment, the Image/Video Precognition tool enable the AI model to monitor weather from satellite imagery or, with respect to sports, you can run simulations of what-if scenarios.

The image classification tool enables to classify the images into categories (e.g., types of pills, animals, and buildings). Unlike the object detection tool and the image semantic segmentation tool, the image segmentation tool, doesn't detect precise pixel regions of the object from the image, but rather holistically labels what (e.g. the images) it "sees". The character recognition tool is configured to enable the AI model for mechanical or electronic conversion of images of typed, handwritten or printed text into machine-encoded text, whether from a scanned document, a photo of a document, a scene-photo (for example, the text on signs and billboards in a landscape photo) or from subtitle text superimposed on an image (for example, from a television broadcast).

The AI model hub further provides the tools such as a natural language processing (NLP) tool, a named entity recognition tool, a language translation tool, a text summarization tool, a paraphrase tool, a dialog manager tool, a Q/A chatbot tool, a text classification tool, a data mining tool, and a topic modelling tool. The NLP tool enables the AI model to understand and interpret human language. The Human language is received/obtained and analyzed by the system to understand and interpret the human language. Due to elements such as dialects, grammar associated with the human languages and the constant evolution of human languages, the NLP tool involves most challenging and complicated operations. For an instance, the NLP tool analyses the human language (either in speech form or text form) and determines at least adverse reactions, factors and events that requires attention in the human language.

The named entity recognition tool enables the AI models to locate and classify entities from unstructured text into predefined categories, such as key people, adverse reactions, medication errors, medical codes, time expressions, quantities, monetary values, percentages etc. The AI models captures the context of the human language correctly to accurately reflect natural language patterns. From the human language obtained/received (either in the text form or speech form, the AI tool recognizes and classifies each word/term into its respective predefined categories.

The relation extraction tool analyses the human language and captures words associations and relationships between phrases. The relation extraction tool enables the AI models to function like a human reading and understanding the human language. The relation extraction tool has useful applications in decoding medical literature. In an embodiment, the AI models are trained to analyze and understand a human language, a machine-readable language etc. The language translation tool (Beta) enables the AI models to create custom language translators that are specific to a domain. For an instance, whenever "$CH_4$" comes, the custom language translators specific to a Chemistry domain understands and considers as "Methane".

The text summarization tool enables to generate summaries from long documentation. In an embodiment, the text summarization tool is configured to generate the summaries to the specific domain. The text summarization tool is configured to analyze the long documentation, understand narratives and capture important elements that are significant. The paraphrase tool enables the AI models to easily understand complex jargon, complex phrases, etc. The paraphrase tool is configured to generate paraphrases that are human-like and highly functional. The dialog manager tool is a component of a dialog system, responsible for the state and flow of the conversation. The dialog manager tool upon execution receives human utterance as input and processes the human utterance into a set of tasks to process. The AI models are enabled to read and react (e.g. answers) according to the human utterances (e.g. Questions). The Q/A chatbot tool enables the AI models to create realistic conversational chatbots that convincingly stimulate how a human would behave as a conversational partner. The AI models in association with the NLP tools is equivalent to, or indistinguishable form, that of a human (i.e. capable of Turing test.).

The text classification tool enables to perform document classification or document categorization under a group or a category. The topic modelling tool enables the AI model to analyze the document and discover abstract "topics" from the documents. The data mining tool enables the AI model to discover hidden semantic structures in a text body and intuitively understand the different topics covered in the given document.

Under the time series, the AI model hub provides a model selection tool, a geo spatial data enabled time series tool, a region map tool, a geo spatial grid and heat map tool, etc. The model selection tool enables to pick the AI model available in the AI model hub to perform time series related functions. The time series models are selected based on type and volume of the data. The time series model provides an advantage of building/selecting the AI model that forecasts at least one of trends and risks from different data sources. The geo spatial data enabled time series tool enables to visualize how metrics change over time embedded on top of a map through the geo spatial data. The region map tool enables to creates a classification-based AI model and/or a regression-based AI model. The classification-based AI model and/or the regression-based AI model aggregated by different regions and detect patterns or anomalies in map (e.g. choropleth map). The geo spatial grid and heat map tool enables to build the AI model from the geo-spatial data grid or heat map to monitor events.

Under the point cloud, the AI model hub provides a medical imaging tool, a 3d topology tool, a landmark and architecture tool, etc. The medical imaging tool visualizes the point cloud data (e.g. 3d physical models. 3d virtual models) of at least one region of interest (e.g. lungs) and hunt for tumors, diseases, etc. The 3D topology tool enables to use satellite imagery or drone footage to create accurate 3D topology models in 3D space and map it to 2D geospatial data through just a few clicks. The landmark and architecture tool enables to build the optimized AI tool to detect at least landmark, building, vehicle, in a 3d space (e.g. LIDAR data).

Under Structured data, the AI model hub provides the AI model such as a regression model, a sequential model, and a classification model. The regression model predicts a numeric value from the data. Some examples of regression problems include how much will a house sell for or how much will a given consumer spend on a website in the next month. The classification model predicts a category from a discrete, fixed number of possible categories from the data provided. Some examples of classification problems include whether an email is spam or not, or what type of classes a student might be interested in. If your target column's value can be one of three or more choices, then you have a multiclass classification problem. A classification model has a target column that is categorical. The sequential model can be either the classification or the regression model, in which each row is in sequential order.

Under speech, the AI model hub provides a speech-to-text tool and a text-to-speech tool. The speech-to-text tool enables to convert the audio (either from a living organism like human or machine) to text and learn from the audio. The speech-to-text tool also transcribes the audio to text. In an embodiment, the speech-to-text tool enables to create the custom speech-to-text. The text-to-speech tool converts the text to audio and trains the AI model to speak like the user and/or in a human voice. The data pipelines provide a data join feature. This is a key aspect of most complex data. Data often need to be joined with other data to get the full picture. The data pipelines allow to easily join the data (i.e., Full Join. Inner Join. Left Join. Right Join), filter out unwanted data, and select specific fields to include in the newly joined dataset that is ready to be indexed.

The data pipelines provide real-time data streams. The real-time data streams are built for real-time data. The system enables to easily hook the real-time data streams, message queues, or real-time API endpoints through an ingestion unit and securely index the data. The data pipelines also provide data lake and data marts that index the metadata that lets to easily visualize, analyze, and create the AI models with high efficiency. For more complex data dependency, the system allows to create data marts that can be linked to the data pipelines API to index the data. The data pipelines offer a graphical user interfaces to schedule the data extraction automatically from third-party databases. The system also enables to anonymize PII data, extract geo-coordinates, parse, and transform on-the-fly. The data pipelines provide a graphical interface lets the user to parse, filter, and enrich data on-the-fly during ingestion. The data pipelines enable to capture unstructured files such as images, videos, text narratives. PDFs. 3D files, and audio data—all of which can be ingested, visualized, annotated, and used to build the custom neural networks. The system provides a custom structured feature by using the data pipelines API to upload the data into natively supported document-based data store.

In an embodiment, the system enables to build data pipelines. The system further enables the user to scale the data pipelines and ingest the data from various sources simultaneously and consolidate the data. The data pipelines are configured to ingest the data (e.g. structured, unstructured and semi-structured simultaneously) from the disparate data sources. The system further enables to schedule data ingestion workflows and run periodic data backups a data snapshot tool. The data snapshot tool automatically uploads the data at scheduled time. The system enables to distribute each schema of the data to be distributed across the various servers (e.g. nodes) to ensure fault tolerance. The system also enables the user to scale the data pipelines and hook the data pipelines to existing of data lakes or data warehouses.

The system provides dashboards and visualizations. The elegant visualization and dashboards that guide the user to ask the right questions, making the use cases of the AI obvious. The dashboards and visualizations bridges gap between data science and data visualizations. The date visualization functions as lens to data science. The system enables to conduct preliminary investigations and identify trends in the data through the platform before building the AI models. The system also monitors dashboards and visualizations catered to your requirements. The visualization and business intelligence (BI) suite visualizes the structured, the semi-structured and the unstructured data (e.g., Images, Videos, Raw Text, etc.) together. The dashboards and visualizations provide (a) single data, multiple dimensions, (b) analyze the data holistically from multiple data sources, (c) AI powered visualization, (d) share notifications, dashboards, and alerts, and (e) further enables the user to collaborate and catalog the data.

The system further provides Role-based User and Data Management. The system is a multi-tenant platform that lets to configure user access and user roles based on a predefined rule. Furthermore, the system enables to set user assigned permissions to different tools in the platform (i.e., Model Builder and Data Annotation tools). This allows a team of the user to stay focused on their task. The system further provides data explorations and search, in which the system enables to organically monitor, listen, and search large streams of data. The intuitive interface lets to seamlessly search and catalog the data as the user explores and creates AI-driven dashboards to answer questions.

The system further provides visualizations as a service using a robust visualization engine. The robust visualization engine publishes the visualization as a service. The visualization service allows to embed interactive data visualizations inside websites. CRMs, and web applications. The visualization service further allows to choose from a plethora of data visualizations, ranging from basic charts and time-series visualizations to complex 3D geospatial tools. The system further enables the user to share the users' visualizations across the organization of the user to leverage enterprise wide visibility. The system further provides advanced visualizations. Under the advanced visualization service, the system enables the user to visualize the unstructured data and the complex annotations from Images. Videos. 3D files, natural language, geo-spatial, and audio—all from a single platform. The state-of-the-art visualization tools enables the user to create custom alerts that passively monitor the data for anomalies. The system also enables the user to control as per the user preference to receive notifications by adding team members of the user and configuring the priority type of the user's alert.

The system lets the user to know where customers are located by countries, states, or continents. Know their demographics, tailor your products to make more impact. The system further enables the user to know the customers better by analyzing several metrics. The system also enables the user to perform several visualizations and combine them into a single dashboard. The system also enables to use out of the box machine learning models to make forecasts and have greater impact. The system is configured to perform a real time trend analysis and gain valuable insights on emerging trends by studying causes and catalysts from social media. The system is configured to cross-examine trends in the social media against trends in the data. The system analyzes the social data through both a macroscopic and microscopic lens. The system is configured to perform image search and insights through at least searching, tagging and classifying the images. The system is configured to recognize patterns from images on the fly. The system enables the user to use the reverse image search tool to find similar images, use OCR to track buzzwords or logos from images, and use Facial Analysis to track emotions from the photos.

The system also performs sentiment tracking through the AI model. The system applies sentiment filters in real-time to track emotional responses from a feedback. The system then analyzes the sentiment polarity of social media users in real-time and observe and track changes in user moods. The system through the AI model perform location analysis and track real-time location patterns from the social data. The system enables the user to use customizable heat maps (i.e., activity clusters) to monitor and analyze complex data relationships. The system saves all analyses, saved and uses for report generation. The system also performs user analytics by visualizing user patterns from feedback, conversations, and application usage. The system also performs media analysis by measuring niche metrics from audience reach through media insights and analytics. The system also monitors images, and videos trending in conversations, news, and media. The system performs media insights.

The system finds applications in industry and government. Under industry the system finds applications in at least but not limited to pharmaceutical, medical imaging, biology and life sciences, manufacturing, retail, automotive, health and medical, agriculture, etc. Under Government, the system finds applications in Border Patrol and Security. Econometrics, atmospheric and geo-spatial data, acquisition and spending, transportation, etc. Under the border patrol and security, the AI model, for an instance in a computer vision, counts and tracks the exact location/time of crimes in real-time captured from unmanned aerial vehicle or drone streams using the AI model that never sleeps. Under the econometrics, the AI model, for an instance in a time series, predict and forecast important economic trends such as diseases, vaccines. GDP, and health metrics. Under the geo-spatial data, the AI model, recognizes weather anomalies from satellite imagery using a geospatial AI tool/service. Unique geospatial visualizations enable the user to understand shifting weather patterns e.g., IDIQ wind speeds, concentration of ash, dirt, or vapor in our atmosphere. Under the budget and finance, the AI models forecast current trajectory of dollars obligated for contract X by the end of this year by each contract type (e.g., IDIQ, BPA, Single Award, Multiple Award, T&M etc.). Under the transportation, the unique data visualization engine lets the user to cross-analyze and visualize geospatial data from different sources (e.g., accident reports and traffic safety metrics from shapefiles) all together in just one map.

The system through the server also provides services/tools such as data annotations, search and data cataloging, model lifecycle management, dashboard and visualization. AI enhanced robotic processed automation. Under data annotation, the system provides tools such as text annotation, image and video annotation, 3D annotation, and structured data annotation. The text annotation tools enable the user through the AI model to create comprehensive text annotations, word associations, and other annotations. The system also enables the user to build Language AI models through the platform and integrate with an existing infrastructure. The structured data tool enables to label the data and spreadsheets, and understand the user requirement in predicting numerical values. The image and video annotaion tool labels, flags and captions the images and videos seamlessly. The system through the server saves, re-purposes the labels and the annotations associated with the images and videos of the data. The 3d annotation tool is configured to visualize 3D files of the data exiting in different data formats making them almost impossible to annotate. The system ingests 3D data in any format imaginable—CT scans. LIDAR, drones, autonomous vehicles and enables the user to label and/or annotate the 3D files and its data sets. For an instance, the system, through the server via the 3d annotation tool, visualizes the 3D scene and enables the user to label and annotate the at least one object (e.g. streetlight).

The system, through the server provides the searching and cataloging service/tool under which the data are joined, aggregated, filtered by correct terms, and applied to the predefined rules. The predefined rules may comprise business rules. The server comprises the schema layer that holds the structured the semi-structured data, and the unstructured data, and leverage the data pipelines to make sure that the data stays up-to-date. Under the searching and cataloging service, the system enables the user to create search tables, set filters and aggregate and error correction. The search tables tool upon execution filters the data by search queries, no matter how complex the data it is. The system assists and creates saved search tables and dashboards that you can return to later. The search tables can be used to build predictive models through the Model Builder tool/service. The system enables to set filters and aggregation. The filters and aggregation tool/service enables the user to select and curate the data in a way that the model can learn and predict from in the future. The set filters and aggregate tool to shape the data properly that can be mapped to the AI model and also build the AI model that are optimized to the predefined rule. The error correction tool/service provides editing capabilities to the data to provide complete form of the data and to correct spelling errors. The server provides the user interface to the user to edit and modify the data and saves the user from time consuming data refreshes and re-ingestion.

The system through the server, via the user interface, build, tune, customize, scale, share, serve, compare and integrate the AI model. The system also visualizes the model as it learns, allowing the user to verify and benchmark the model against other models. If needed, the system easily re-train and improve existing models from where you left off based on the input from the user. The system also transfers the learning, by creating models on top of existing models. The system is configured to share the existing models and re-purpose them.

The system also enables the user to scale the AI model based on increasing demands. The system enables the AI model (e.g. the final AI model) to scale from just a few AI models to literally a limitless number, all in just a few simple steps. The system also provides AI resource monitoring by providing complete visibility into resources utilized for training and serving machine learning models. The system guides the user to best leverage the platform to manage all your AI models from simple graphical interfaces.

Under the dashboard and visualization service, the server provides data data preparation and visualizations under which data visualizations play a key role in preparing the data for machine learning. Data visualizations service/tool is configured to investigate and analyze the data for valuable insights, enabling your analyses to be more targeted and precise. The data visualizations tool empowers the user with a stronger data-intuition, which will help the user to identify the right AI model. The dashboard and visualization tools further perform passive data monitoring and exploration. The server passively monitors the data and generates a more holistic view of the user's network and informs the user of potential issues that may be directly affecting. The system enables the user to customize the dashboard by providing elegance and order for the data. The server through the user interface enables the user to plan, design and refine the dashboard. The system also assists the user in creating stunning dashboards intuitively.

The system, through the server, provides AI robotic process automation (RPA). The AI robotic process automation (RPA) bridges a gap between automation and intuition. The AI robotic process automation (RPA) assists the user in reducing their manual work and to leverage AI using the AI Models API to automate employee-driven manual work. The AI robotic process automation feature keeps the user free copy and paste, re-key, complete an e-form or other forms of manual data entry, ever again. The AI robotic process automation completes the manual "hand" work of collecting and collating disparate data faster and more accurately than humanly possible. The AI models assesses whether the data meets complex quality and compliance metrics and flag high-risk data accordingly and generate above-mentioned insights. The AI model by performing all these insights empower the user (e.g. a reviewer, a regulatory analyst, etc.) to quickly pinpoint and take corrective actions.

The system, integrates the AI robotic process automation with brain power of the AI model. The AI model be an intelligence tool (e.g. brain) behind the RPA solution for your business needs, and watch your organization's efficiency, accuracy, and consistency increase diametrically over and beyond any standalone RPA solution, human or machine. The system also provides cognitive document automation (CDA). The cognitive document automation is enhanced through the NLP enabled AI model. Consider an example of processing structured and unstructured documents and data, manual work that is often overwhelming and a task no RPA solution could on its own handle without massive manual programming. With the integration of RPA and AI model, however, manual documents processing goes from a mundane, time-consuming task to CDA. For example, an average RPA program can open an email message without human interaction; but an AI-powered CDA scans and automatically tags it so the appropriate alerts can be triggered.

The system, under the AI robotic process automation, provides Intelligent Screen Automation (ISA). The Intelligent Screen Automation (ISA) is enhanced through a computer vision. Besides the CDA, the ISA is the other most popular application of AI-enhanced RPA, though there are many more potential AI services. If the RPA is the "robot" and AI the "brains," then think of ISA as the "eyes" of your customized solution, where—if only an image is returned, e.g., in remote desktop environments or where there is no direct access to an application—an average RPA solution would be hamstrung.

The AI-integration, the system converts to ISA, which uses artificial neural networks to analyse images, e.g., of the application in question for which there is no direct access. The ISA automatically creates user interface objects for the robot designer to use in building the software robot (i.e., the RPA solution). The result is the faster RPA and one that does not depend upon screen resolution, menu items, buttons, or other "visual" cues to perform tasks.

The system further provides AI-enhanced RPA in the Real World. The AI-enhanced RPA in the Real World finds application in port and border security. While scanning nowadays can be automated with a little programming, that data must still be manually processed and assessed for risk. The AI model, however, this overwhelming task becomes infinitely quicker, intuitive, and powerfully predictive. Rather than manually reviewing 26,000 container scans per day one-by-one, the AI-integrated RPA solution can be customized to generate a report indicating which of the 26,000 containers are likely to be high, medium, and low risk. The time previously spent by CBP staff and agents to conduct this same risk assessment can now be converted into time conducting investigations.

The AI-integrated RPA provides both technical services and SaaS support. The system assists the user to integrate the AI with an RPA solution. The system is configured to provide training and hands-on requirements analysis. The AI-powered RPA solution built also dynamically adapt to your ever-evolving business needs. The AI model Hub is an all-in-one business intelligence suite that utilizes a host of cutting-edge processes, such as machine learning (ML), natural language processing (NLP), etc. The system increases dramatically power of the user's work.

FIG. 1a illustrates an architecture diagram of a system, according to one or more embodiments. The system comprises a server, a device 102, and a database. The device is associated with a user. The server may communicate with the device 102 through a wired connection and/or a wireless connection. The user interacts with the server through a web service and/or an application accessed via the device 102. The server provides a user interface to the user through at least one of the web services, and/or the application. In an embodiment, the server is configured to at least one of but not limited to data mining, data manipulation, data processing, data transferring, data consolidation, etc. In another embodiment, the server is configured to at least one of but not limited to build an artificial intelligence (AI) model and for the artificial intelligence lifecycle management. The AI model may comprise at least one of a machine learning (ML) model, and a neural network.

The server comprises a core web service 104 104, an authentication service 106, a schema management service 118, a machine learning service 108, an annotator service 110, a visualization and search service 112, a scheduler service 114, a load balancer 120, and a utility service 116. The core web service 104 provides the user interface to the user via the device associated with the user. The core web service 104 receives an input from the user and communicates an output to the user through a media transceiver. The core web service 104 function as proxies to one or more internal services provided by the server. The core web service 104 are responsible for execution of the one or more internal services provided by the server.

The authentication service authenticates and authorizes the user to interact with the server upon providing user credentials. The core web service 104 allows the user to interact with the server upon the authentication and the authorization of the user is enabled by the user. The core web service 104 receive data from a data source. In an embodiment, the core web service 104 receives the data from the data source in real-time. The data received may comprise at least one data format of at least one of structured data, semi-structured data, and unstructured data. The at least one data format may comprise at least one of csv, excel, pdf, html, docx, etc. The core web service 104 indexes the data and analyzes the received data. The scheduler service 114 schedules and uploads the data automatically to the database. In an embodiment, the scheduler service 114 schedules and extracts automatically the data automatically from a third-party database. The third-party database may be an open source database and/or a private database. In another embodiment, the scheduler service 114 extracts the data automatically from the third-party database and uploads the data automatically from the third-party database to the database. In another embodiment, the scheduler service 114 enables the user to create an alert and indicates to the user when there is an anomaly in the data. In another embodiment, the scheduler service 114 alerts the user at a certain time set by the user The schema management service 118 visualizes the data available in the database at that instant and determines at least the structured data (e.g. accounting transactions, address details), the semi-structured data (e.g. email messages), and the unstructured data (e.g. photos, video, pdfs, and audio files). The structured data are the data that are arranged in rows and columns, that are readily processed. The semi-structured data is a form of the structured data that does not obey tabular structure and does not reside in a relational database. The relational database is a collection of data items with pre-defined relationships between the data items. The schema management service 118, upon visualizing the data and determining at least the structured data, the semi-structured data, and the unstructured data, then determines at least a data pattern and a location of the data. The schema management service 118 further visualizes the data and stores the structured data in the structured database, the semi-structured data in the semi-structured database and the unstructured data in the unstructured database. The core web service 104 provides a visualization toolbox. The visualization toolbox comprises different data visualizations (like around 20 to 30 different data visualization all are used to do different kinds of data visualization), some can be applied to the structured data, some can be applied to the unstructured data. The visualization toolbox allows the user to choose and select the at least one data visualization and also provides a wizard to select which schema of the data to be visualized. The visualization toolbox also provides at least one visualization panel to sort the data and search the data, create data visualizations from the schema in a way that is that is meaningful, aggregate data, etc. The visualization toolbox enables the user to create the visualization. The visualization toolbox provides the wizard (like a series of steps to be followed) to create the data visualizations. The visualization toolbox enables the user to interact, drag, drop and add the data visualization, once the visualization is created. The user upon dragging, dropping and adding the data visualization, the visualization toolbox provides different charts and metrics and things like that. The visualization toolbox also allows the user to combine from different schemas together and provide it in the dashboard to the user.

The data visualizations play a key element of the AI model building. An AI model creation workflows server comprises a visualization component (e.g. the visualization toolbox) that is necessary to first analyze, filter, remove, join, and manipulate the data in various ways before the data inputs can be ready to be processed for creating the machine learning model/the AI model. Hence, the tools/services (i.e. zero-code tools) that are provided in the platform that are presented in a way that allows the user to logically shift from data analysis, to data labeling and subsequently to data science, and provide several ways to apply the AI model to enhance the analysis and improve the prediction capabilities of the AI as an iterative process (i.e. a series of guided steps in which no programming is needed in-order to create prepare and analyze the data for machine learning).

The core web service 104 analyze the schema management service 108 and determines that the schema management service 108 is applied to at least one AI model (e.g. a regression model, a classification model, etc.) and a field to which the at least one model. Based on the data type, the core web service 104 identify the at least one AI model and the field to which the at least one AI model belongs. The schema management service 108 actually holds the structured data, the semi-structured data, and the unstructured data and based on at least identifying the at least one model and the field to which the AI model belongs (using the data), the input mapping is performed by mapping the appropriate data to the AI model (e.g. the appropriate AI model) and the least one field (e.g. computer vision, object detection. NLP, etc.). The data is mapped to the AI model for data analysis, labels and annotations, cataloging, filtering, customizing the AI model, AI model lifecycle management etc. For an instance, the core web service 104 maps the data to the AI model (e.g. the regression AI model) and the schema management service 108 is applied to appropriate machine learning, when the data comprises the numerical values. In an embodiment, the schema management service 108 comprises a machine learning optimized schema management service 108. For an instance when the schema management service 108 is not intended for audio, then the schema management service 108 is not applied for audio related machine learning i.e. with that schema management service 108, the speech to text or do some sort of audio extraction is not possible, capability. The schema management service 108 stores metadata and configuration information as well. The schema management service 108 is not like one database table or something but a kind of spread out.

The core web service 104 enables the user to interact with the server and build the AI model. The core web service 104 may build the AI model automatically. In an embodiment, the AI model is built based on the data available in the database, a predefined rule, and the input from the user. The predefined rule may comprise a set of rules that are set by the user and/or associated with an organization of the user. In an embodiment, the user may comprise a techie and/or an analyst of the organization. The analyst may be a data analyst whose job is to perform data mining, data manipulation, data transfer, data consolidation, data processing, data mapping, etc.

The core web service 104 builds the AI model by preparing the data comprising the at least one data format that are intended for the AI model. The core web service 104 then selects at least one node and establish interconnections and communications between the at least one node. The core web service 104 selects at least one node that are intended for the AI model based on draw back that is to be solved by the AI model, and the data available in the database. The machine learning service 108 then trains the at least one node of the AI model to do an intended processing. Once the AI model is built, the AI model is then deployed. The AI model may be implemented in at least one of but not limited to a computer vision, a natural language processing, a time-series, a geo-spatial, point cloud, a structured data and a speech data. In an embodiment, the user is allowed to select the AI model from the server based on type and volume of the data. In another embodiment, the server provides guides and recommendations for choosing the right AI model based on the type, the volume of the data and the predefined rule.

For example, the system, may receive an input, and performs the following steps to create the AI model in a computer vision from raw images. The system first Ingest Images & Video into the schemas. The system then analyses the Image & Video of potential dataset to train the AI model. The system then labels and annotates the Image & Video. The system trains the data using the data at that instant. The system then creates the AI model (e.g. object detection, image semantic segmentation, classification) and visually measures the quality of the model. The system may also Schedule re-training of the AI models to improve metrics (e.g. mean average precision, recall, accuracy, etc.) based on user-defined logic. The system the finally applies the AI model (I.e. the computer vision model).

The core web service 104 further enables the user to build at least one data pipeline. The core web service 104 may build the at least one data pipeline automatically. In an embodiment, the at least one data pipeline is built based on the data available in the database, the predefined rule, and the input from the user. The at least one data pipeline comprises a plurality of data processing elements that are arranged in at least one order (e.g. series, time-sliced, etc.). The machine learning service 108 analyze the data available in the database and trains the AI model built. In an embodiment, the machine learning service 108 trains the AI model based on at least one of the data available in the database, the predefined rule, and labels and annotations associated with the data. For an instance, when the AI model built is intended for processing of geo-spatial data, the machine learning service 108 trains the AI model using the geo-spatial data, the predefined rule, and the labels and the annotations associated with the geo-spatial data.

The machine learning service 108 further re-trains the AI model using the data available in the database available at that instant/point of time. In an embodiment, the machine learning service 108 re-trains the AI model based on at least one of the data available in the database, the predefined rule, and the labels and the annotations associated with the data at that instant/point of time. The core web service 104 is configured to customize the AI model based on data manipulation. The core web service 104 customizes the AI model by at least one of adding, modifying, removing the at least one node of the AI model, and training the AI model based on the data manipulation. In an embodiment, the AI model is customized depending on the problem that are to be addressed by the AI model.

The core web service 104 is configured to share the AI model as at least one of a web service, and an application to a client of the user. The core web service 104 shares the AI model by deploying the AI model on a cloud server and/or a physical server. The core web service 104 is configured to compare a first AI model and a second AI model and provide the output to the user. The core web service 104 determines a first configuration of the first AI model and a second configuration of the second AI model. The core web service 104 then communicates the output to the user by comparing the first configuration of the first AI model and the second configuration of the second AI model.

The core web service 104 is configured to replicate the first AI model and build the second AI model by establishing the at least one node and interconnection between the at least one node same as that of the first AI model. In this case (i.e. when replication happens) the second AI model is the replication of the first AI model. The core web service 104 is configured to integrate the first AI model, the second AI model and a third AI model by communicatively coupling the first AI model, the second AI model, and the third AI model and establishing communications and interconnections between the first AI model, the second AI model and the third AI model. The core web service 104 also records history of customizations, processing, and/or modifications performed on the AI model.

The visualization and search service 112 visualize the data available in the database and determines at least the structured data, the semi-structured data, and the unstructured data. The visualization and search service 112 are then configured to enable the user to interact, search and extract the data from the database. In an embodiment, the visualization and search service 112 is then configured to retrieve first data sets from the data. The annotator service 110 performs at least one of labeling the data and annotating the data. The annotator service 110 labels the data by adding a word and/or a short phrase to the data. The annotator service 110 annotates the data by adding remarks to the data. In an embodiment, the annotator service 110 is configured to label the data and annotate the data to readily distinguish between the data and readily identify the location of the data. In another embodiment, the annotator service 110 is configured to label the data and annotate the data to enable the machine learning service 108 to train the AI model based on the data, the location of the data, and the labels and the annotations associated with the data. The annotator service 110 is further configured to label and annotate the data in the at least one data format (e.g. pdf, audio, image, video, text, point cloud). The labelling and annotation service/tool are crucial for preparing the AI model. The labelling and annotation service/tool comprise a complex labeling taxonomy system that is versatile for a broad data manipulation configured in a way that is ready to train the AI model. The system comprises internal model and schema configuration and annotation mappings stored so that it allows the system to recognize and allow certain data types to be acceptable inputs for the AI model to train or predict on.

The load balancer 120 is configured to balance load of the data to at least a first database server 122, a second database server 124, etc. In an embodiment, the load balancer 120) estimates the load of the data and splits the data and stores the data onto the first database server 122 and the second database 124 in a balanced manner such that the first database 122 and the second database server 124 comprise an equal amount of the data. The load balancer 120 is associated with the structured database/data store. The first database server 122 stores the data in a first block storage 126 and the second database server 124 stores the data in a second block storage 128. In an embodiment, the load balancer 120 is associated with the semi-structured database and the unstructured database. The first database server 122 and the second database server 124 are scaled on demand i.e. depending on the load of the structured data. Similarly, the semi-structured database/data store and the unstructured database/data store 130 are scaled on demand i.e. depending on the load of the semi-structured data and the unstructured data respectively. The utility service 116 co-ordinates all the one or more internal services provided by the server and further configured generate reports on all activities executed on the server.

Figure 1B:
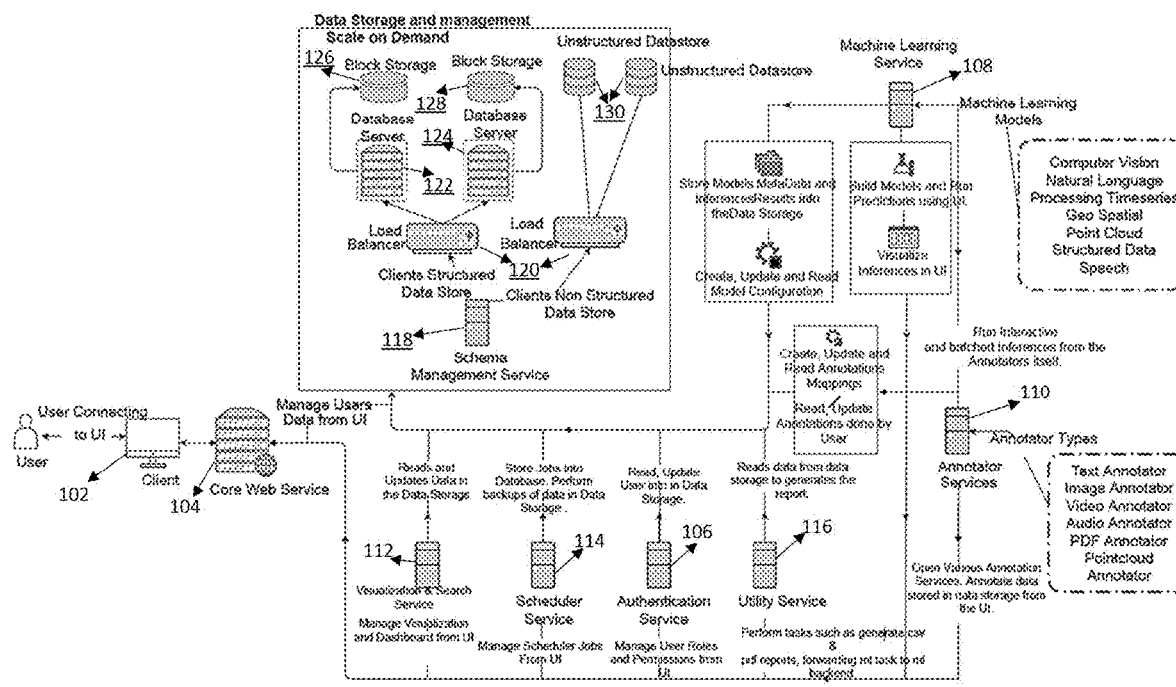
FIG. 1b illustrates a control flow diagram of a system, according to one or more embodiments.

FIG. 1b illustrates a control flow diagram of a system, according to one or more embodiments. The control flow diagram comprises a server, a device, and a database. The device is associated with a user. The server may communicate with the device through a wired connection and/or a wireless connection. The user interacts with the server through a web service and/or an application accessed via the device. The server provides a user interface to the user through at least one of the web services, and/or the application. In an embodiment, the server is configured to at least one of but not limited to data mining, data manipulation, data processing, data transferring, data consolidation, etc. In another embodiment, the server is configured to at least one of but not limited to build an artificial intelligence (AI) model and for the artificial intelligence lifecycle management.

The server comprises a core web service 104, an authentication service, a schema management service 108, a machine learning service 108, an annotator service 110, a visualization and search service 112, a scheduler service 114, a load balancer 120, a utility service 116, an unstructured database/data store 130, structured database/data store, semi-structured database/data store. The core web service 104, the authentication service, the schema management service 108, the machine learning service 108, the annotator service 110, the visualization and search service 112, the scheduler service 114, the load balancer 120, the utility service 116, etc. are described in already in FIG. 1*a*. In addition to the architecture diagram shown in FIG. 1*a*, the control flow diagram further comprises control flow connections between components depicted in the control flow diagram.

The core web service 104 provides and receives the control flow to and from the rest of the components. Further the machine learning service 108 further provides the control flow to build an AI model and to run predictions using a user interface (UI). The system provides control to machine learning service 108 to visualize inferences in the UI based on the predictions run. The machine learning service 108 is further configured/provides control to create, update and the read the AI configuration. The system provides control to machine learning service 108 to store at least meta data and the inference results into the data store. The system provides control to machine learning service 108 to create, update and read annotation mappings from/to the data and to create and/or read annotations performed by the user.

The data from the machine learning service 108 is then fed to the schema management service 118. The system provides control to the visualization and search service 112 to read and update the data into the data storage. The system provides control to the scheduler service 114 to store jobs into database and perform backups of data into the data storage. The data storage may be the database. The system provides control to the authentication service 106 to read and update user info into the data storage. The system provides control to the utility service 116 to read data from the data storage to generate at least one report. The system provides control to the annotator service 110 to run interactive and batched inferences from the annotators itself and open various annotation services, annotate data stored in the data storage from the UI.

Figure 2:
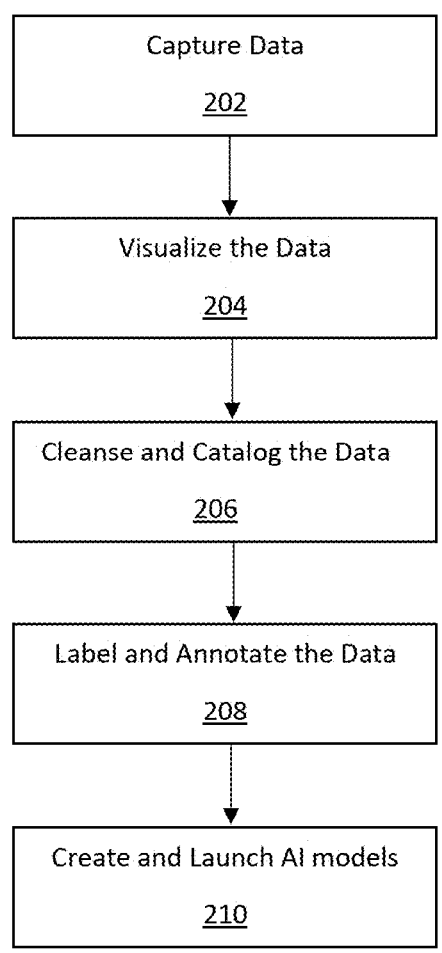
FIG. 2 illustrates a method of AI model building and AI lifecycle management, according to one or more embodiments.

FIG. 2 illustrates a method of AI model building and AI lifecycle management, according to one or more embodiments. The method comprises five steps: 1) Step 202: Capturing data, 2) Step 204: Visualizing the data, 3) Step 206: Cleansing and cataloging the data. 4) Step 208: Labeling and annotating the data, and 5) Step 210: Creating and launching an artificial intelligence (AI) model. The first step of capturing data comprises capturing at least one of structured data and unstructured data. In an embodiment, the data exists in at least one data format across data sources. The data is received from the data source. The data is then indexed and analyzed. The data is then scheduled and uploaded automatically to the database using a secure data pipeline application programming interface (API). The data pipelines are capable of capturing and recording the data of different data formats such as CSV, images, videos, database tables, raw text. XML. PDFs. Data Streams etc. The second step of visualizing the data serves as lens to data science. The data is visualized to conduct preliminary investigations and identify trends, categories in the data. The data is categorized under respective categories (e.g. structured, unstructured, semi-structured, etc.). In an embodiment, the data is visualized using a schema layer. The schema layer along with data visualization enables to visualize the structured data and the unstructured data (e.g. Images. Videos. Raw text, etc.). The schema layer holds the unstructured data and the structured data together, which provides the ability to visualize the unstructured data and analyze the unstructured data. The search dashboards are created and provided to the structured data and the unstructured data using the schema layer.

The data may comprise first data (e.g. bad data), second data (e.g. good data). The first data and/or the second data is then cleansed and filtered. The system identifies and recognizes location of the first data based on at least one of a predefined rule, and an input from a user. The input may comprise selecting particular data sets from the data. The second data, and/or the data desired by the user are only left after the cleansing and filtering step. The cleansing and filtering data comprises at least one of removing duplicate data, filtering data by search queries, fix spelling errors, filter incomplete data and aggregate values, etc. The data is also then cataloged to record a directory of information of at least meta data, data sets, files, and database information onto the database.

Once the data is cleansed, filtered and cataloged, the data is then labeled and annotated. The labelling and annotation step/service/tool is crucial for preparing the AI model. The labelling and annotation step/service/tool comprises a complex labeling taxonomy system that is versatile for a broad data manipulation configured in a way that is ready to train the AI models. The system comprises internal model and schema configuration and annotation mappings stored so that it allows the system to recognize and allow certain data types to be acceptable inputs for the AI model to train or predict on.

The data is labelled to distinguish between the data, identify the data readily and recognize the location of the data. The data is then annotated to provide remarks, comments and/or to handle the data with appropriate care. In an embodiment, the data is labeled and annotated to teach and/or train the artificial intelligence model. In another embodiment, the data is labeled and annotated to enable the artificial intelligence model to quick retrieval and/or processing (e.g. filtering, cataloging, categorizing, segmenting, conversion to desired format, etc.) of the data.

Figure 3A:
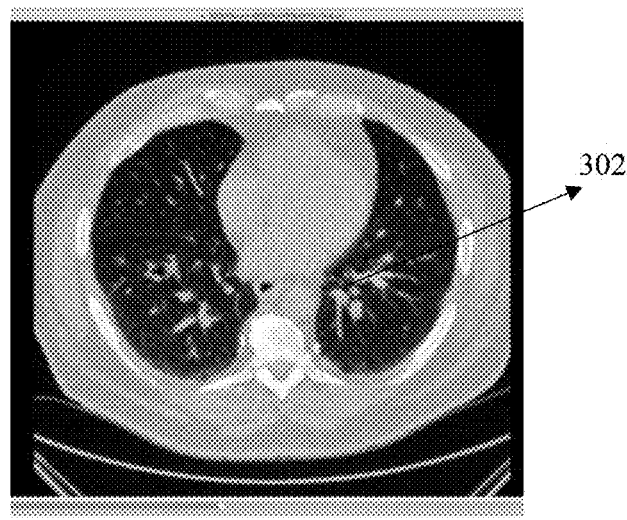
FIG. 3a illustrates an AI model trained and applied in a computer vision technology to detect nodules of a medical image, according to one or more embodiments.

The artificial intelligence model is then created and launched based on the data available in the database. The artificial intelligence model is now ready to learn. A user interface (e.g. graphical user interface) is provide to the user via a device to build, evaluate, design and improve the artificial intelligence model. In an embodiment, the AI model is then at least one customized, re-trained and built by a server on the fly. In another embodiment, the AI model is then at least one of served, shared and replicated (e.g. cloned). In yet another embodiment, the AI model is then effectively customized, integrated and lifecycle of the artificial intelligence model is managed by the server. In another embodiment, the server assists the user in minimizing/reducing the manual work in their business functions by at least one of building, training, re-training, customizing, sharing, comparing and integrating the AI model based on the data available in the database, the predefined rule and the input from the user. In an embodiment, the AI model is trained from datasets in a way to recognize certain patterns within the data that is not non-obvious in terms of detection methods that are logic & rule (e.g. the predefined rule) based. In an embodiment, the artificial intelligence model is deployed as a physical server in premises (e.g. residential, commercial, etc.) and/or organization of the user. In another embodiment, the artificial intelligence model is deployed in a cloud (e.g. AWS, GCP, AZURE, etc.). In yet another embodiment, the artificial intelligence model is deployed both physically (e.g. the physical server) and in the cloud FIG. 3a illustrates an AI model trained and applied in a computer vision technology to detect nodules of a medical image, according to one or more embodiments. The medical image shown in FIG. 3a is a computed tomography (CT) scan image. The AI model undergoes training from a plurality of CT scan images and the AI model learns from the plurality of CT scan images to detect at least one feature. One the CT scan image (shown in FIG. 3a) is provided as an input, the AI model detects at least one or a nodule 302, a tumor, a cancer, etc. from the CT scan image.

Figure 3B:
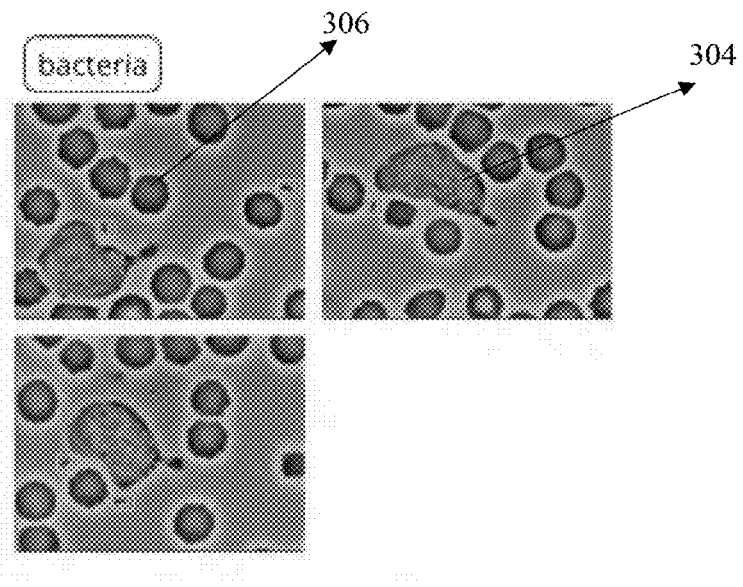
FIG. 3b illustrates an AI model trained and applied in an object detection technology in a field of biological science to detect white bloods cells and bacteria, according to one or more embodiments.

FIG. 3b illustrates an AI model trained and applied in an object detection technology in a field of biological science to detect white bloods cells and bacteria, according to one or more embodiments. As the AI model has undergone training and learnt from a plurality of similar images, the AI model detects the white blood cells 304, and the bacteria 306 from an image given as an input to the AI model. In an embodiment, the AI model detects and indicates the white blood cells 304, and the bacteria 306 in real-time while performing medication through a pointer. For an instance, the AI model trained and applied in the object detection technology is employed for at least one of face detection, pedestrian detection, pothole detection, etc.

Figure 3C:
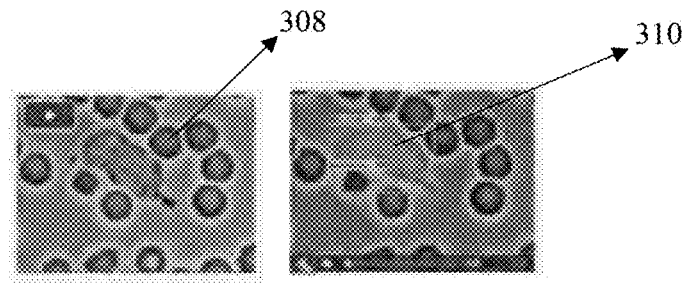
FIG. 3c illustrates an AI model trained and applied in an image semantic segmentation technology to detect white blood cells and bacteria, according to one or more embodiments.

FIG. 3c illustrates an AI model trained and applied in an image semantic segmentation technology to detect white blood cells and bacteria, according to one or more embodiments. The AI model, trained with a plurality of similar images, performs a pixel level classification and a pixel level detection on an image to detect the white blood cells 308 and the bacteria 310. For an instance, the AI model trained and applied in the image semantic segmentation technology is configured to detect boundaries and edges of a region of interest captured in the image. In an embodiment, the AI model herein detects each pixel in the image and assign a label to every pixel in the image such that pixels with the same label share certain characteristics.

Figure 3D:
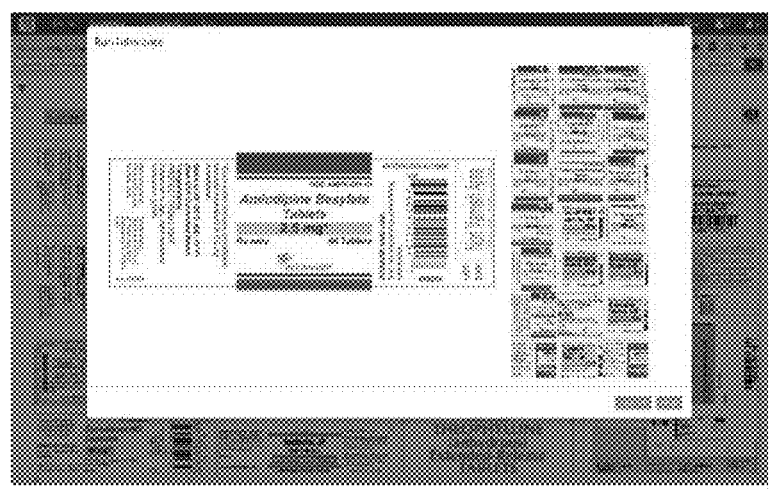
FIG. 3d illustrates an AI model trained and applied in a computer vision technology to detect similar image of a plurality of drug labels, according to one or more embodiments.

FIG. 3d illustrates an AI model trained and applied in a computer vision technology to detect similar image of a plurality of drug labels, according to one or more embodiments. The AI model, trained using a plurality of drug labels, analyses and detects the similar image from the plurality of drug labels. In an embodiment, the AI model detects the similar image from the plurality of drug label by performing a reverse image search based on design, font, color, etc. The AI model also detects the similar image from the plurality of drug labels based on at least one of a drug name, a drug composition, a drug company name, etc. listed on the plurality of drug labels. The AI model finds application across many industries; for instance, you can avoid designing a product that is too similar to an existing product in the market (for example, drug pills or drug cartons).

Figure 3E:
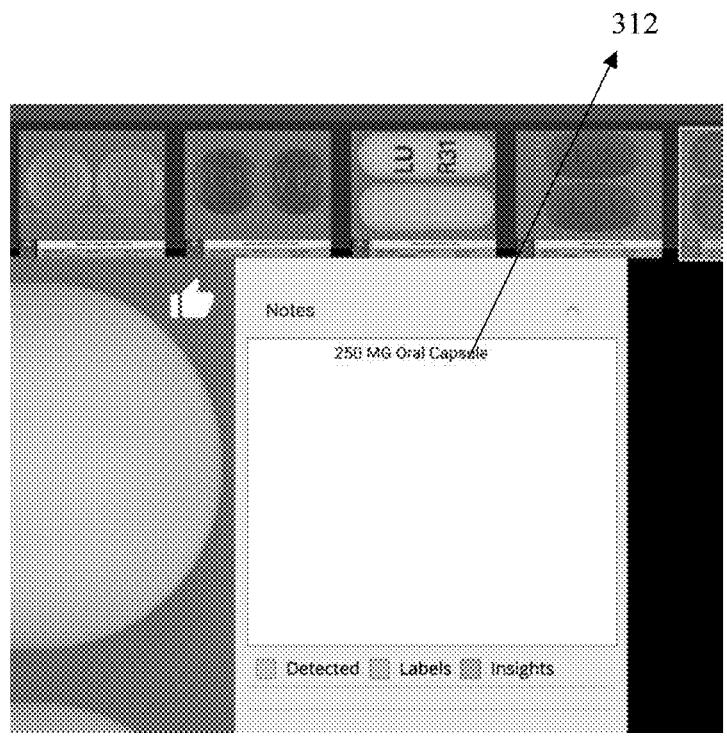
FIG. 3e illustrates an AI model trained and applied in a computer vision technology to caption an image of a drug pill, according to one or more embodiments.

FIG. 3e illustrates an AI model trained and applied in a computer vision technology to caption an image of a drug pill, according to one or more embodiments. The AI model, trained using a plurality of images of drug pills, analyses and learns a drug name from the plurality of drug pills. The AI model then provides a caption 312 to the image of the drug pill that is provided as an input to the AI model. For an instance, when the image of Paracetamol is provided as input to the AI model, the AI model exactly captions the image as "Paracetamol" based on at least one of a drug composition, a drug color, etc. The AI model finds application in areas of image retrieval systems to organize and locate images of interest from a database.

Figure 3F:
FIG. 3f illustrates an AI model trained and applied in a computer vision technology to generate successive frames of a video and/or a series of images, according to one or more embodiments.

FIG. 3f illustrates an AI model trained and applied in a computer vision technology to generate successive frames of a video and/or a series of images, according to one or more embodiments. The AI model analyses frames of at least one of the series of images and/or the video and predicts successive frames and generates the successive frames of the at least one of the series of images and/or the video. The successive frames generated depicts that what happens next or in future after a certain period of time. For a first instance, when the video comprises a satellite imagery feed, the AI model analyses the imagery feed and generate the successive frames (i.e. upcoming frames that are not het happened) depicting weather forecasting, cloud movement, etc. For a second instance, when the video comprises a vehicle travelling on a road at a first location, the AI model analyses the video and generate the successive frames depicting the vehicle travelling on the road at a second location. The AI model finds application to monitor weather from satellite imagery or, with respect to sports, you can run simulations of what-if scenarios.

Figure 3G:
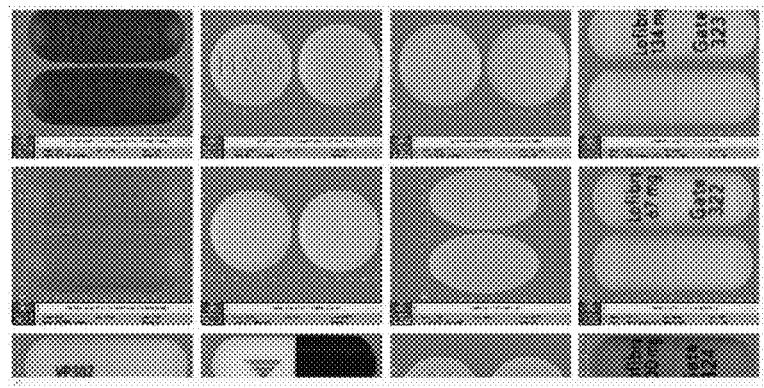
FIG. 3g illustrates an AI model trained and applied in an image classification to automatically classify and group at least drug, according to one or more embodiments.

FIG. 3g illustrates an AI model trained and applied in an image classification to automatically classify and group at least one drug, according to one or more embodiments. The AI model analyses a plurality of drug pills and automatically classifies and categorizes a first drug pills under a first group, when the first drug pills comprises at least one of a first size, a first composition, first shape, a first color, etc. Similarly, the AI model analyses the plurality of drug pills and classifies and categorizes a second drug pills under a second group, when the second drug pills comprises at least one of a second size, a second composition, a second shape, a second color, etc. For an instance, when the plurality of drug pills comprises Paracetamol pills. Anacin pills, etc., the AI model classifies and categorizes the Paracetamol pills under the first group and the Anacin pills under the second group, etc. For another instance, the AI model trained in biological science detects animals, buildings from an outside scene, streetlights and classifies the animals, the buildings and the streetlights etc. under the respective groups/categories.

Figure 3H:
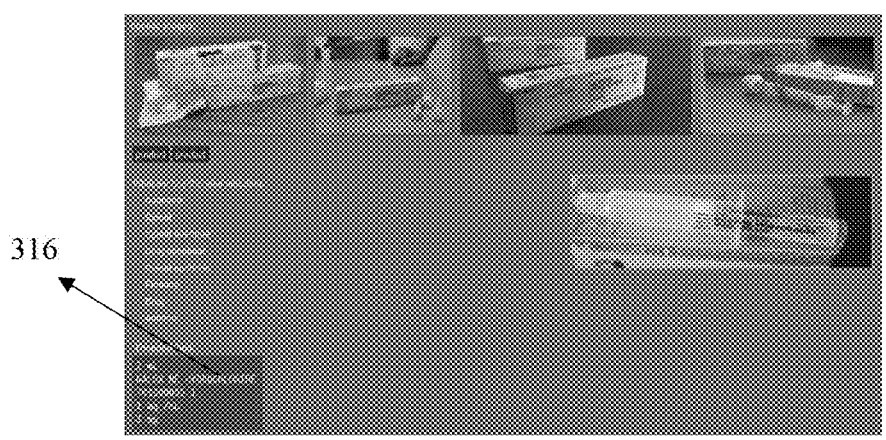
FIG. 3h illustrates an AI model trained and applied in an optical character recognition (OCR) capability to automatically recognize the OCR of an image, according to one or more embodiments.

FIG. 3h illustrates an AI model trained and applied in an optical character recognition (OCR) capability to automatically recognize the OCR of an image, according to one or more embodiments. The AI model analyses the image and automatically recognizes at least a text, a picture, etc. from the image. For an instance, when the image of a drug container is provided as an input, the AI model exactly recognizes the OCR like text, image etc. on the drug container. For an instance, the AI model trained in the OCR converts the image of typed, handwritten or printed text into machine-encoded text, whether from a scanned document, a photo of a document, a scene-photo (for example, the text on signs and billboards in a landscape photo) or from subtitle text superimposed on an image (for example, from a television broadcast).

Figure 3I:
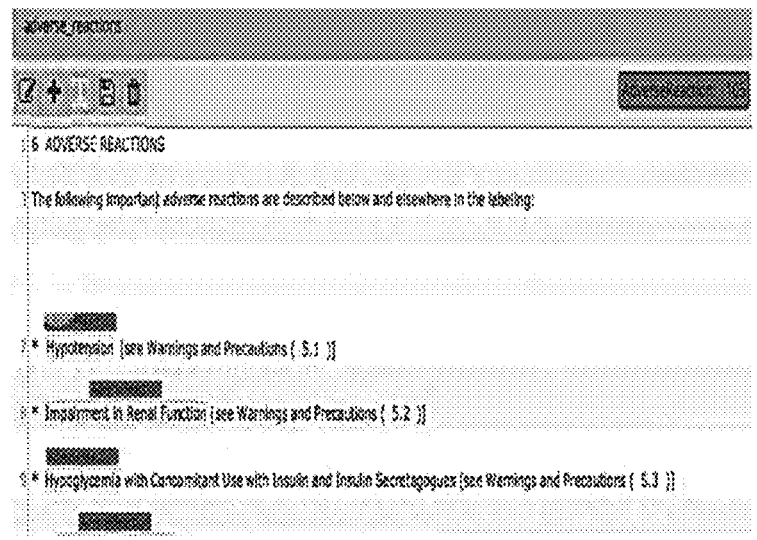
FIG. 3i illustrates an AI model trained and applied in a named entity recognition (NER) technology to automatically recognize at least one parameter from a literature, according to one or more embodiments.

FIG. 3i illustrates an AI model trained and applied in a named entity recognition (NER) technology to automatically recognize at least one parameter from a literature, according to one or more embodiments. The literature shown in FIG. 3*i* comprises a medical literature. The AI model completely scans and/or reads the medical literature (provided as an input) and identifies the at least one parameter 316 from the medical literature. The at least one parameter may comprise an adverse reaction, medication error, factor, severity, medical codes, etc. from the medical literature. The AI model find application in decoding the medical literature. For an instance, when the literature is economic related literature, the trained AI model, classifies the at least one parameters/entities such as percentages, monetary values, quantities, etc.

The AI model also captures word associations and relationships between phrases in the literature provided. The AI model is also configured to create custom language translation that are specific to a domain. The AI model also generates summaries and paraphrases from the literature/along documents specific to the domain upon training is provide to the AI model in that domain. The summary comprises important elements that are discussed in the literature/long documents. The paraphrases are human-like and highly functional. The AI model comprises a dialog manager component that determines state and flow of the conversation in the literature and/or human utterance. An input to the DM is human utterance that gets processed into a set of tasks to process to rad and react according to human questions. The AI model generates conversational chatbots based on the literature and/or the human utterance to convincingly simulate how a human would behave as a conversational partner. The AI model further classifies the documents/literature under a particular class and/or a category. The AI model also discovers topics from the documents/literatures and discovers hidden semantic structures in a text body of the literature/document and intuitively understand the different topics covered in the given document/literature. In an embodiment, the AI model converts the data from the literature to speech (i.e. text to speech) and speech to text. The AI model learns speech patterns such as tones, inflections, intonations and coverts the text to be read like a human. The AI model also transcribes speech data into the text.

Figure 3J:
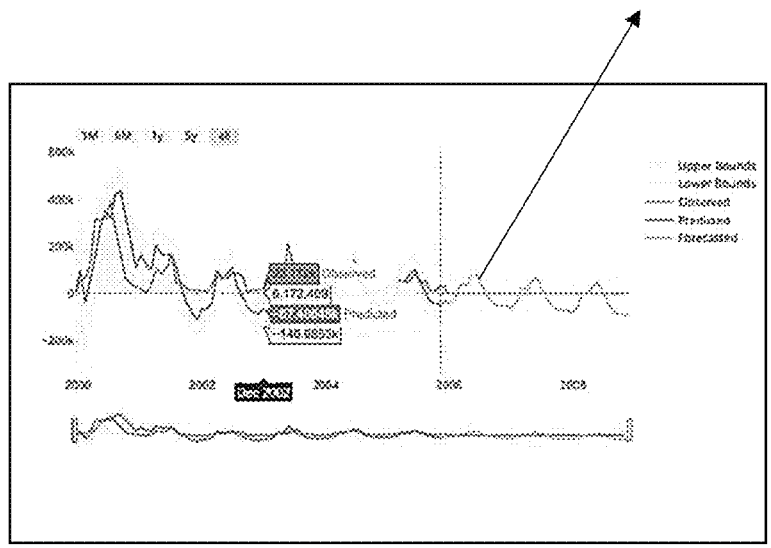
FIG. 3j illustrates an AI model trained and applied in a time series to automatically predict at least one future pattern of a graph, according to one or more embodiments.

FIG. 3*j* illustrates an AI model trained and applied in a time series to automatically predict at least one future pattern of a graph, according to one or more embodiments. The image shown in FIG. 3*j* is an exemplary screenshot of the at least one future pattern predicted by the AI model. For an instance, when data (up to year 2006) corresponding to a graph is provided as an input to the AI model, the AI model analyzes the at least one pattern associated with the data and predicts the at least one future pattern 318 for upcoming years (i.e. after 2006) based on the data. The at least one data pattern may depict at least one of risks and trends from the data. In an embodiment, the AI model is configured to apply time metrics on geospatial data and depict how the time metrics change over time embedded on top of a map. The AI model detects geospatial patterns from the data.

Figure 3K:
FIG. 3k illustrates an AI model trained and applied to geo-spatial data to automatically predict boundary of at least one state based on at least one aggregated metric, according to one or more embodiments.

FIG. 3*k* illustrates an AI model trained and applied to geo-spatial data to automatically predict boundary of at least one state based on at least one aggregated metric, according to one or more embodiments. The AI model analyses the geo spatial data provided and predicts and indicates the boundary 320 of the at least one state using the geo-spatial data and the at least one aggregated metric associated with the at least one state. In an embodiment, the AI model creates classification and regression and detects patterns or anomalies from the geo-spatial data. In another embodiment, the AI model creates geospatial grid and/or heat map to monitor at least one event associated with the geo-spatial data.

Figure 3L:
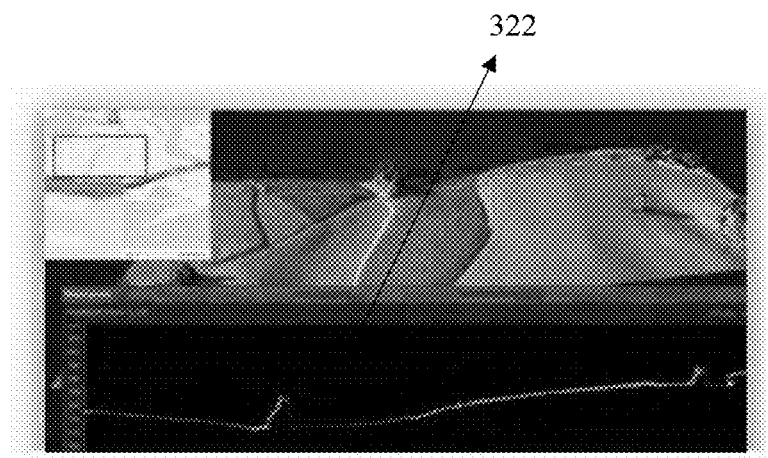
FIG. 3l illustrates an AI model trained and applied to point cloud data to automatically visualize and label a topographical region of the point cloud data, according to one or more embodiments.

FIG. 3*l* illustrates an AI model trained and applied to point cloud data to automatically visualize and label a topographical region of the point cloud data, according to one or more embodiments. The AI model analyzes the point cloud data from a satellite imagery or a drone footage and visualizes the point cloud data. Upon visualizing the point cloud data, the AI model labels the topographical region 322 on the point cloud data. In an embodiment, the AI model annotate the topographical region on the point cloud data. In another embodiment, the AI model creates the topological region in 3D space and map it to 2D space through just a few clicks.

Figure 3M:
FIG. 3m illustrates an AI model trained and applied to a three-dimensional point cloud data to automatically visualize and label a landmark, according to one or more embodiments.

FIG. 3*m* illustrates an AI model trained and applied to a three-dimensional point cloud data to automatically visualize and label a landmark, according to one or more embodiments. The AI model analyzes the 3D point cloud data and visualize the 3D point cloud data. Upon visualizing the 3D point cloud data, the AI model labels the landmark 324 on the 3D point cloud data. In an embodiment, the AI model annotate the landmark on the 3D point cloud data. In an embodiment, the AI model visualizes and detects at least one landmarks, buildings, vehicles, etc. from Light Detection and Ranging (LIDAR) data.

Figure 3N:
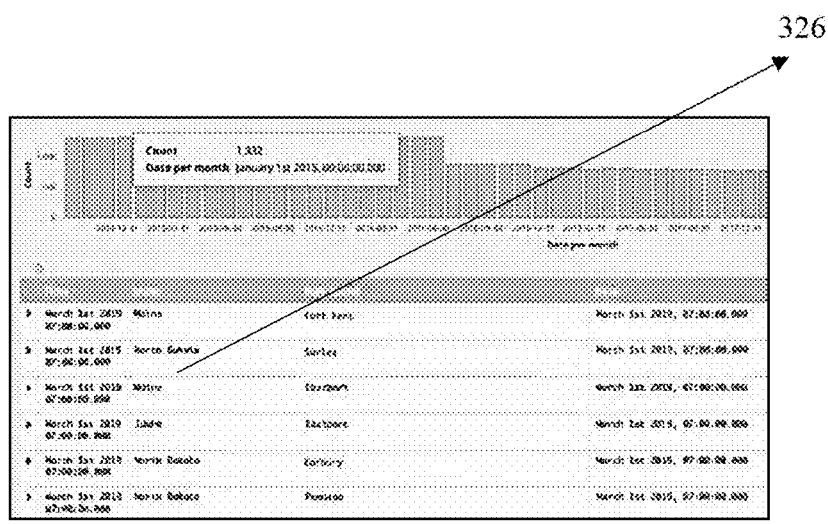
FIG. 3n illustrates an AI model trained and applied to a search visualization to search and retrieve data from a database, according to one or more embodiments.

FIG. 3*n* illustrates an AI model trained and applied to a search visualization to search and retrieve data from a database, according to one or more embodiments. The AI model analyzes the data from the database and visualizes the data. The AI model extracts and retrieves the data from the database based on an input from a user. The AI model provides the data 326 in at least one order based on an input provided by the user. In an embodiment, the AI model predicts a numeric value in a column or a row, like sale value of house, consumer expense on next month, etc. In another embodiment. The AI model also predicts a category from a discrete, fixed number of possible categories, when the AI model comprises a regression model. For an instance, the AI model detects an email message and classifies whether the email message is a spam. For a second instance, the AI model detects an interest of a student in a class. For a third instance, the AI model also performs a multi-class classification based on the data stored in a target column that is categorical, when the AI model comprises a classification model. For a fourth instance, the AI model arranges each row of the data in a sequential order, when the AI model comprises a sequential model.

Figure 3O:
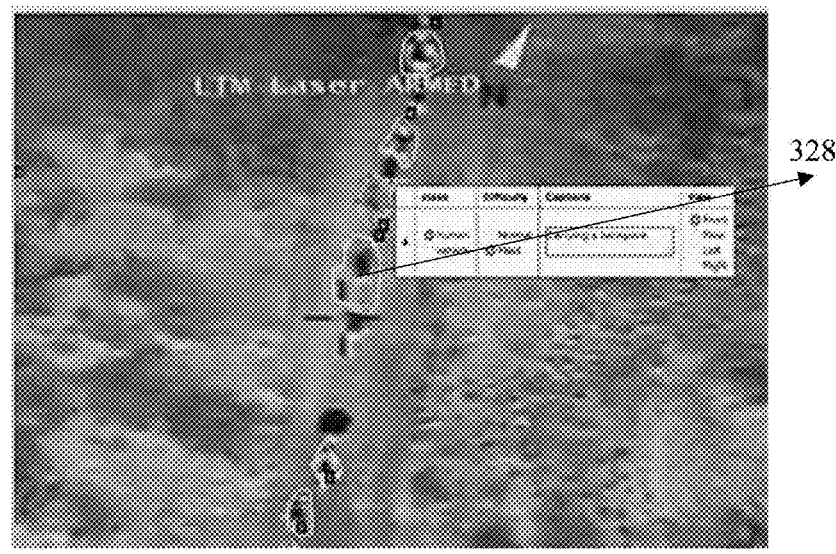
FIG. 3o illustrates an AI model trained and applied in a computer vision technology to perform image/video labeling on an aerial feed, according to one or more embodiments.

FIG. 3*O* illustrates an AI model trained and applied in a computer vision technology to perform image/video labeling on an aerial feed, according to one or more embodiments. The AI model analyzes the aerial feed, provided as an input, and visualizes the aerial feed. Upon visualizing the aerial feed, the AI model label at least one feature from the aerial feed. In an embodiment, the AI model annotates the at least one feature 328 from the aerial feed.

Figure 3P:
FIG. 3p illustrates an AI model trained and applied on a three-dimensional (3D) point cloud data of a street to label a streetlight, according to one or more embodiments.

FIG. 3*p* illustrates an AI model trained and applied on a three-dimensional (3D) point cloud data of a street to label a streetlight, according to one or more embodiments. The AI model analyzes and visualizes the three-dimensional (3D) point cloud data of the street. The AI model then identifies a location of the streetlight and labels the streetlight as 330.

Figure 3Q:
FIGS. 3qa and 3qb illustrate an AI model trained and applied on a computer vison and object detection to check container labels for errors.
Figure 3Q:
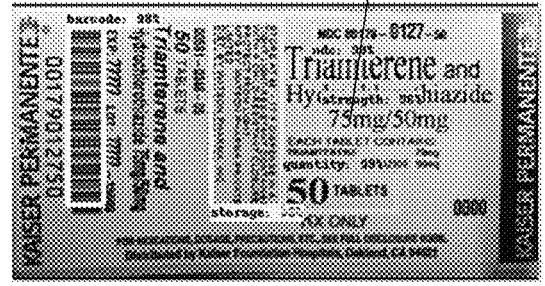

FIGS. 3*qa* and 3*qb* illustrate an AI model trained and applied on a computer vison and object detection to check container labels for errors. FIG. 3*qa* is an image before processing (i.e. an input) and FIG. 3*qb* is an image after processing (i.e. an output). The AI model analyzes and visualizes the container labels on carton labeling to minimize the errors. The AI model then analyzes at least one object 331 such as a text, an image, quantity etc. from the container labels for errors, and compliance to efficiently promote safe dispensing, administration and product use, etc.

Figure 3R:
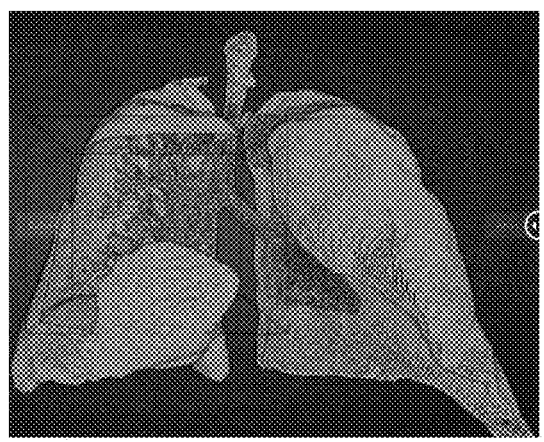
FIGS. 3ra and 3rb illustrate an AI model trained and applied on a three-dimensional (3D) point cloud data of a medical image, according to one or more embodiments.
Figure 3R:
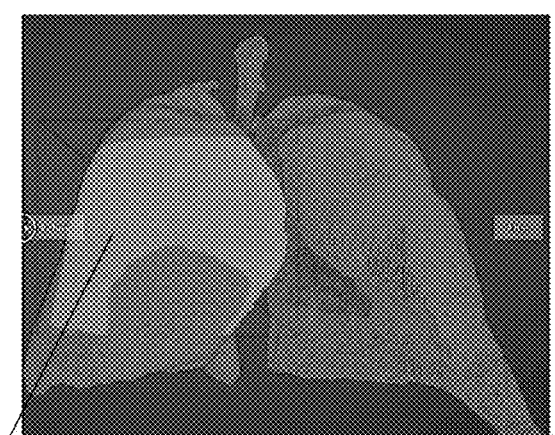

FIGS. 3*ra* and 3*rb* illustrate an AI model trained and applied on a three-dimensional (3D) point cloud data of a medical image, according to one or more embodiments. FIG. 3*ra* is the medical image before processing (i.e. an input) and FIG. 3*rb* is the medical image after processing (i.e. an output). The AI model visualizes the three-dimensional (3D) point cloud data of the medical image and labels at least one organ on the medical image. For an instance, the AI model labels and/or detects the at least one organ based on the labels and hunt for at least one feature 332 such as tumor, nodules, diseases, etc. and provides an output (i.e. processed image output to the user. The output image depicts at least one of percentage of diseases in the medical image.

Figure 3S:
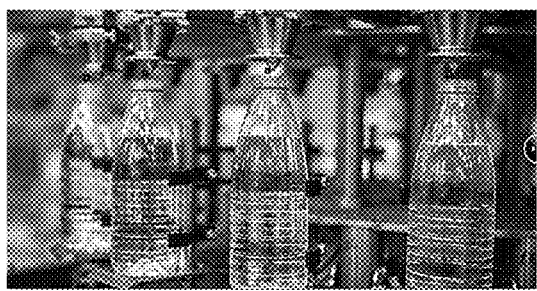
FIGS. 3sa and 3sb illustrate an AI model trained and applied on a computer vison and object detection to detect at least one object in a manufacturing site, according to one or more embodiments.
Figure 3S:
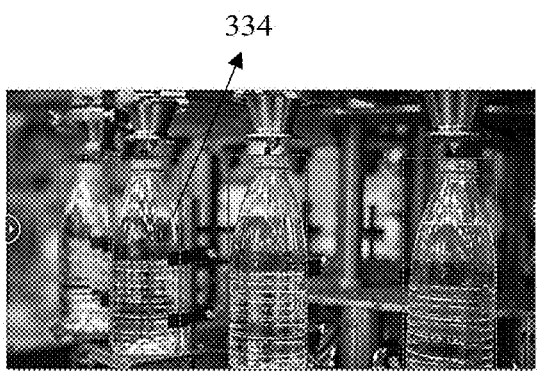

FIGS. 3*sa* and 3*sb* illustrate an AI model trained and applied on a computer vison and object detection to detect at least one object in a manufacturing site, according to one or more embodiments. FIG. 3*sa* is an image before processing (i.e. an input) and FIG. 3*sb* is an image after processing (i.e. an output). The AI model analyses and visualizes the manufacturing site and detects the at least object 334 that moves in predefined spots (shown in FIG. 3*sb*) at the manufacturing site. For an instance, in a water bottle manufacturing and/or packaging industry, the AI model detects a water bottle in the predefined spots where the water bottle continuously moves and identifies the water bottle and communicates a signal for at least one of filling water into the water bottle, affixing a label, etc.

Figure 3T:
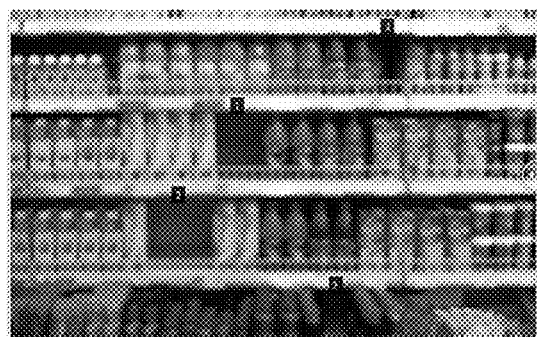
FIG. 3ta and FIG. 3tb illustrate an AI model trained and applied on a computer vison and object detection to detect at least one object and/or a space in a retail store, according to one or more embodiments.
Figure 3T:
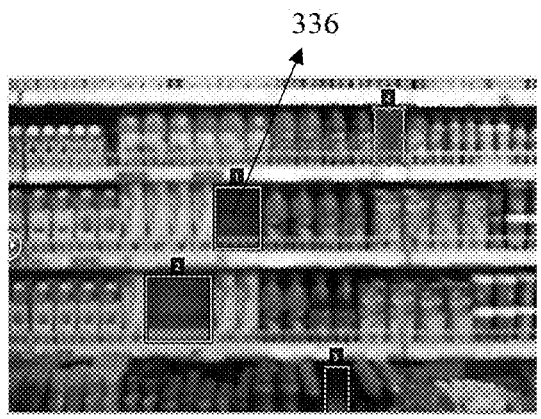

FIG. 3*ta* and FIG. 3*tb* illustrate an AI model trained and applied on a computer vison and object detection to detect at least one object and/or a space in a retail store, according to one or more embodiments. FIG. 3*ta* is an image before processing (i.e. an input) and FIG. 3*tb* is an image after processing (i.e. an output). The AI model analyses and visualizes the retail store and detects the at least one object and the space 336 (shown in FIG. 3*tb*) in the retail store. In an embodiment, the space in the retail store is labeled and/or annotated that the space in a predefined location belongs to the at least one object. When the AI model detects that there is space in the predefined location of the retail store, the AI model communicates a signal/alerts that the at least object to be filled in the space. In an embodiment, the AI mode automatically orders the at least one object from a wholesale store.

FIG. 3*ua* and FIG. 3*ub* illustrate an AI model trained and applied on a computer vison and object detection to detect at least drought areas and diseased crops in an image of agricultural field, according to one or more embodiments. FIG. 3*ua* is the image before processing (i.e. an input) and FIG. 3*ub* is the image after processing (i.e. an output). The image of the agricultural field may comprise an aerial image of the agricultural field covering large areas of the agricultural field. The AI model analyses and visualizes the image of the agricultural field and then detects at least the drought areas 338 and the diseased crops 340 from the image (shown in FIG. 3*ub*). In an embodiment, the AI model detects the diseased crops 340 of the agricultural image and distinguishes between first diseased crops and second diseased crops.

Figure 3V:
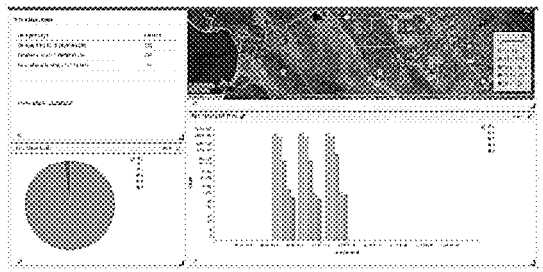
FIG. 3va to FIG. 3vf illustrate data visualizations performed by a system, according to one or more embodiments.
Figure 3V:
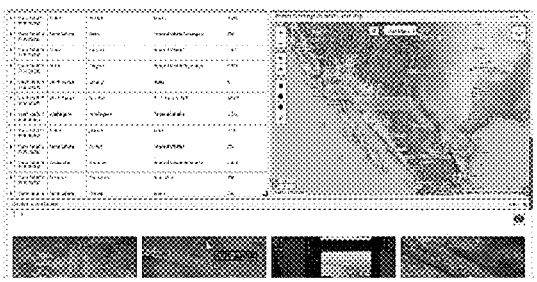
Figure 3V:
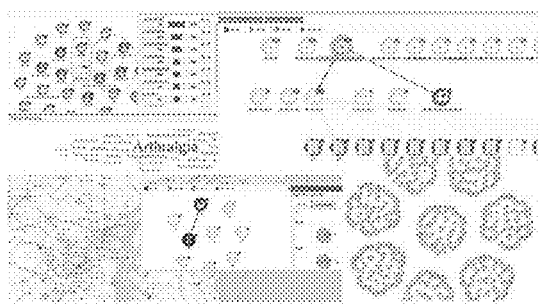
Figure 3V:
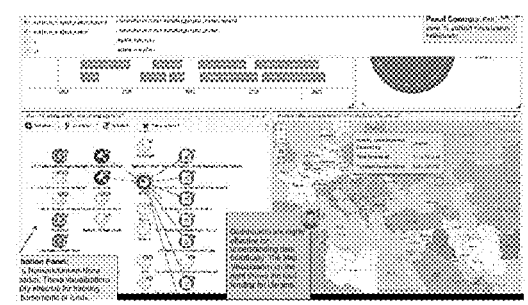
Figure 3V:
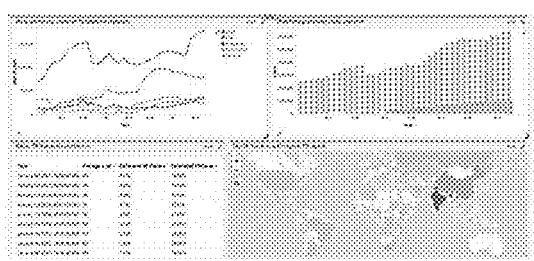
Figure 3V:
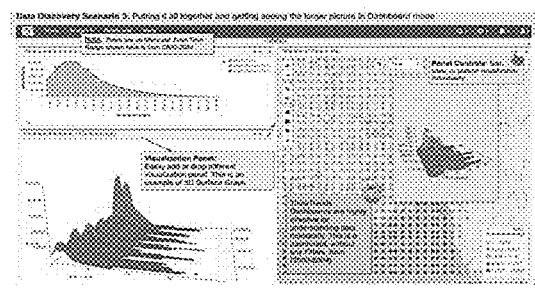

FIG. 3*va* to FIG. 3*vf* illustrate data visualizations of a system, according to one or more embodiments. The system provides a visualization toolbox through a user interface to a user to interact and to visualize data. The visualization toolbox provides at least one data visualization (like around 20 to 30 different data visualization), some can be applied to structured data, some can be applied to semi-structured data and unstructured data. The visualization toolbox allows the user to choose and select the at least one data visualization. The visualization toolbox further provides a wizard to select which schema of the data to be visualized. The visualization toolbox also provides at least one visualization panel to sort the data, search the data, drag the data and select the data.

The visualization toolbox creates data visualizations from the schema in a way that is that is meaningful, aggregate data, etc. The visualization toolbox enables the user to create the data visualization. The visualization toolbox provides the wizard (like a series of steps to be followed) to create the data visualizations. The visualization toolbox enables the user to interact, drag, drop and add the data visualization in a dashboard, once the visualization is created. The user upon dragging, dropping and adding the data visualization, provides different charts and metrics and things like that. The visualization toolbox also allows the user to combine from different schemas together and provide it in a dashboard to the user. The visualization toolbox compares the different data visualizations.

The visualization toolbox enables the same dashboard to visualize the structured data, the semi-structured data, and the unstructured data. A schema management service holds the structured data, the semi-structured data, and the unstructured data and the visualization toolbox visualizes the structured data, the semi-structured data, and the unstructured data and enables a machine learning services to enable an AI model to learn from the different data visualizations and perform data processing. The system further provides a role-based user access management by enabling the user to set user assigned permissions to at least one tool (e.g. a model builder tool, a data annotation tool, etc.). The system upon visualizing, allows to monitor, explore and search the data. The system also allows the user to seamlessly search and catalog the data as when the user explores and creates AI-driven dashboards to answer your questions.

The visualization toolbox publish visualization as a service and allows the user to embed interactive data visualizations inside websites. CRMs, and web applications. The system further allows the user to choose from a plethora of data visualizations, ranging from basic charts and time-series visualizations to complex 3D geospatial tools. The system is also configured to share the visualizations across an organization of the user to leverage enterprise wide visibility. The visualization toolbox publishes advanced visualization as a service that allows the user to visualize the unstructured data and complex annotations from Images, Videos, 3D files, natural language, geo-spatial, and audio all from a single platform. The visualization toolbox also allows the user to create custom alerts that passively monitors the data for anomalies. The user can control the system to provide notifications to team members of the user by adding the team members and configuring the priority type of the alert.

The foregoing disclosure provides illustration and description, but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones. PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules, units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All patents, patent application publications, and non-patent literature mentioned in the application are incorporated by reference in their entirety.

US20070011183 entitled "Analysis and transformation tools for structured and unstructured data";
US20190114360 entitled "System and method for analysis of structured and unstructured data";
EP3387588 entitled "A method and system for ontology-based dynamic learning and knowledge integration from measurement data and text";
CN110442651 entitled "A method of it is uploaded automatically based on kettle realization excel data and triggers scheduling";
CN108898225 entitled "Data labeling method based on human-machine cooperative learning";
WO2020101108 entitled "Artificial-intelligence model platform and method for operating artificial-intelligence model platform";
CN107832780 entitled "AI (Artificial Intelligence) based low-confidence sample processing method and system of board sorting";
US20170337002 entitled "Dynamically configuring a storage system to facilitate independent scaling of resources";
US20180060744A1 entitled "Systems for second-order predictive data analytics, and related methods and apparatus";
US20170213132A1 entitled "Multiple user interfaces of an artificial intelligence system to accommodate different types of users solving different types of problems with artificial intelligence"

What is claimed is:

1. A method comprising:
receiving data from a data source, wherein the data comprises at least one data format of at least one of structured data, semi-structured data, and unstructured data;
building at least one data pipeline to a server through a user interface by selecting a plurality of data processing elements;
arranging the plurality of data processing elements in at least one order and establishing connection between the plurality of data processing elements;
indexing and analyzing the received data;
scheduling and uploading automatically the data to a database as per the indexing through the at least one data pipeline associated with the server;
visualizing the data using a schema layer of the server and annotation mappings configured to facilitate recognition of data type inputs for an artificial intelligence (AI) model;
cleansing and filtering the data based on at least one of an input from a user, and a predefined rule through the at least one data pipeline associated with the server;
labeling and annotating seamlessly the data available in the database; and
building the artificial intelligence (AI) model based on at least one of the data available in the database, the input from the user, and the predefined rule through a core web service associated with the server for processing the data in the database, wherein building the AI model comprises:
preparing the data comprising the at least one data format that are intended for the AI model;
selecting at least one node through the user interface provided to the user and establishing interconnections and communications between the at least one node;
training the at least one node using the data;
deploying the AI model to process the data and provide an output to the user;
training the AI model using at least one of the data available in the database, labels and annotations associated with the data, and the predefined rule at a first instant;
re-training the AI model using at least one of the data available in the database, the labels and the annotations associated with the data, and the predefined rule at a second instant; and
comparing a first AI model and a second AI model by determining a first configuration associated with the first AI model and determining a second configuration associated with the second AI model and comparing the first configuration and the second configuration.

2. The method of claim 1, further comprising:
sharing the AI model as at least one of a web service, and an application to at least one client of the user by deploying the AI model.

3. The method of claim 1, further comprising:
customizing the AI model by (a) manipulating the data, (b) at least one of adding, modifying, removing the at least one node of the AI model, and (c) training the AI model using the manipulated data.

4. The method of claim 1, further comprising:
integrating a first AI model and a second AI model by communicatively coupling the first AI model and the second AI model and establishing interconnections between the first AI model and the second AI model.

5. The method of claim 1, further comprising:
replicating a first AI model and building a second AI model by establishing the at least one node and interconnection between the at least one node same as that of the first AI model, wherein the second AI model is the replication of the first AI model.

6. The method of claim 1, wherein labeling and annotating seamlessly the data comprises at least one of:
indicating data sets of the data with at least one of a word, a short phrase; and
adding a remark to the data sets of the data.

7. The method of claim 1, wherein training the AI model is further performed based on identifying the at least one data format of the data in the database, determining a data pattern in the database, recognizing a location of the data in the database, and distinguishing between the data.

8. The method of claim 1, further comprising:
providing the user interface to the user through a device associated with the user to interact with the server and build the AI model.

9. The method of claim 1, further comprising:
scaling the at least one data pipeline based on at least one of the data available in the database, data movement, data mining, data manipulation and data processing that are to be executed by the AI model.

10. The method of claim 1, further comprising:
scheduling automatically data extraction from a third-party database and uploading automatically the data to the database by establishing communication between the database and the third-party database.

11. The method of claim 1, wherein building the artificial intelligence (AI) model based on at least one of the data available in the database and the predefined rule:
building the AI model on top of an existing AI model by analyzing the existing AI model and performing at least one of tuning the existing AI model and performing model optimization on the existing AI model.

12. A system comprising:
a server comprising a memory, and a processor communicatively coupled to the memory, the processor configured to
receive data from a data source, wherein the data comprises at least one data format of at least one of structured data, semi-structured data, and unstructured data;
build at least one data pipeline to the server through a user interface by selecting a plurality of data processing elements;
arrange the plurality of data processing elements in at least one order and establish connection between the plurality of data processing elements;
index and analyze the received data;
schedule and upload automatically the data to a database as per the indexing through the at least one data pipeline associated with the server;
visualize the data using a schema layer of the server and annotation mappings configured to facilitate recognition of data type inputs for an artificial intelligence (AI) model;
cleanse and filter the data based on at least one of an input from a user, and a predefined rule through the at least one data pipeline associated with the server;
label and annotate seamlessly the data available in the database; and
build the artificial intelligence (AI) model based on at least one of the data available in the database, the input from the user, and the predefined rule through a core web service associated with the server for processing the data in the database, wherein building the AI model comprises:
preparing the data comprising the at least one data format that are intended for the AI model;
selecting at least one node through the user interface provided to the user and establishing interconnections and communications between the at least one node;
training the at least one node using the data;
deploying the AI model to process the data and provide an output to the user;
training the AI model using at least one of the data available in the database, labels and annotations associated with the data, and the predefined rule at a first instant;
re-training the AI model using at least one of the data available in the database, the labels and the annotations associated with the data, and the predefined rule at a second instant; and
comparing a first AI model and a second AI model by determining a first configuration associated with the first AI model and determining a second configuration associated with the second AI model and comparing the first configuration and the second configuration.

13. A non-transitory computer storage medium storing a sequence of instructions, which when executed by a processor, causes:
receiving data from a data source, wherein the data comprises at least one data format of at least one of structured data, semi-structured data, and unstructured data;
building at least one data pipeline to a server through a user interface by selecting a plurality of data processing elements;
arranging the plurality of data processing elements in at least one order and establishing connection between the plurality of data processing elements;
indexing and analyzing the received data;
scheduling and uploading automatically the data to a database as per the indexing through the at least one data pipeline associated with the server;
visualizing the data using a schema layer of the server and annotation mappings configured to facilitate recognition of data type inputs for an artificial intelligence (AI) model;
cleansing and filtering the data based on at least one of an input from a user and a predefined rule through the at least one data pipeline associated with the server;
labeling and annotating seamlessly the data available in the database; and
building the artificial intelligence (AI) model based on at least one of the data available in the database, the input from the user, and the predefined rule through a core web service associated with the server for processing the data in the database, wherein building the AI model comprises:
preparing the data comprising the at least one data format that are intended for the AI model;
selecting at least one node through the user interface provided to the user and establishing interconnections and communications between the at least one node;
training the at least one node using the data;
deploying the AI model to process the data and provide an output to the user;
training the AI model using at least one of the data available in the database, labels and annotations associated with the data, and the predefined rule at a first instant;
re-training the AI model using at least one of the data available in the database, the labels and the annotations associated with the data, and the predefined rule at a second instant; and
comparing a first AI model and a second AI model by determining a first configuration associated with the first AI model and determining a second configuration associated with the second AI model and comparing the first configuration and the second configuration.

* * * * *